(12) United States Patent
Kowalczyk et al.

(10) Patent No.: US 7,715,683 B2
(45) Date of Patent: *May 11, 2010

(54) FIBER ACCESS TERMINAL INCLUDING MOISTURE BARRIER PLATE WITH PUNCH OUT

(75) Inventors: Scott C. Kowalczyk, Savage, MN (US); Jonathan R. Kaml, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/411,109

(22) Filed: Mar. 25, 2009

(65) Prior Publication Data

US 2009/0185783 A1   Jul. 23, 2009

Related U.S. Application Data

(63) Continuation of application No. 12/029,245, filed on Feb. 11, 2008, now Pat. No. 7,526,173, which is a continuation of application No. 11/585,327, filed on Oct. 23, 2006, now Pat. No. 7,330,628.

(51) Int. Cl.
*G02B 6/00* (2006.01)
*G02B 6/36* (2006.01)
*G02B 6/06* (2006.01)

(52) U.S. Cl. ............................ 385/135; 385/76; 385/88; 385/89; 385/92; 385/94; 385/110; 385/134; 385/136; 385/137

(58) Field of Classification Search ................ 385/76, 385/88, 89, 92, 94, 110, 134, 135, 136, 137
See application file for complete search history.

(56) References Cited

U.S. PATENT DOCUMENTS 4,198,484 A   4/1980   Reichler et al.

(Continued)

FOREIGN PATENT DOCUMENTS

EP   0942303   9/1999

(Continued)

OTHER PUBLICATIONS

"MAH Profile Series™ Pedestal Enclosures,"Channell Commercial Corporation, 4 pages (admitted as prior art as of Jan. 4, 2006).

(Continued)

*Primary Examiner*—Charlie Peng
*Assistant Examiner*—Hung Lam
(74) *Attorney, Agent, or Firm*—Merchant & Gould P.C.

(57) ABSTRACT

A fiber access terminal includes a drop cable side and a distribution cable side. The sides are separated by a frame to which a variety of cable management and cable connections components may be mounted. Optical fibers are routed from drop and distribution cables through a plurality of routing paths to splice trays for connection to other optical fibers. The terminal includes a base and a dome cover mounted to the base defining an enclosed interior. Passageways between the base and the dome cover are closed by removable covers to limit moisture and animals from accessing an interior of the dome cover. A tether connects the removable covers to the frame. The removable covers include one or more break out regions configured for being removed to receive one or more cables.

19 Claims, 23 Drawing Sheets

U.S. PATENT DOCUMENTS

| | | | |
|---|---|---|---|
| 4,377,291 | A | 3/1983 | Albertini |
| 5,278,933 | A | 1/1994 | Hunsinger et al. |
| 5,509,099 | A | 4/1996 | Hermsen et al. |
| 5,556,060 | A | 9/1996 | Bingham et al. |
| 5,708,751 | A | 1/1998 | Mattei |
| 5,758,004 | A | 5/1998 | Alarcon et al. |
| 5,907,653 | A | 5/1999 | Burek et al. |
| 6,411,767 | B1 | 6/2002 | Burrous et al. |
| 7,274,850 | B2 | 9/2007 | Wittmeier et al. |
| 7,292,763 | B2 | 11/2007 | Smith et al. |
| 7,316,518 | B2 * | 1/2008 | Sasaki et al. ........ 403/344 |
| 2006/0193587 | A1 | 8/2006 | Wittmeier et al. |
| 2007/0154159 | A1 * | 7/2007 | Kowalczyk et al. ........ 385/135 |
| 2007/0183732 | A1 | 8/2007 | Wittmeier et al. |

FOREIGN PATENT DOCUMENTS

WO      WO 93/26071      12/1993

OTHER PUBLICATIONS

"Photographs of a metallic prior art grounding lug," 2 photos (admitted as prior art as of Jan. 4, 2006).

"Photographs of Charles Industries pedestal with flexible grommet," 6 photos (admitted as prior art as of Jan. 4, 2006).

ASTM G-21 cited on p. 5 of specification, 1 page (admitted as prior art as of Jan. 4, 2006).

Charles Industries web pages, "Closed architecture fiber pedestals feature a weather-tight ?enclosure within an enclosure? design for superior environmental protection," 3 pages (admitted as prior art as of Jan. 4, 2006).

U.S. Appl. No. 11/335,193, entitled "Fiber Access Terminal Including Moisture Barrier Plate", filed on Jan. 19, 2006.

* cited by examiner

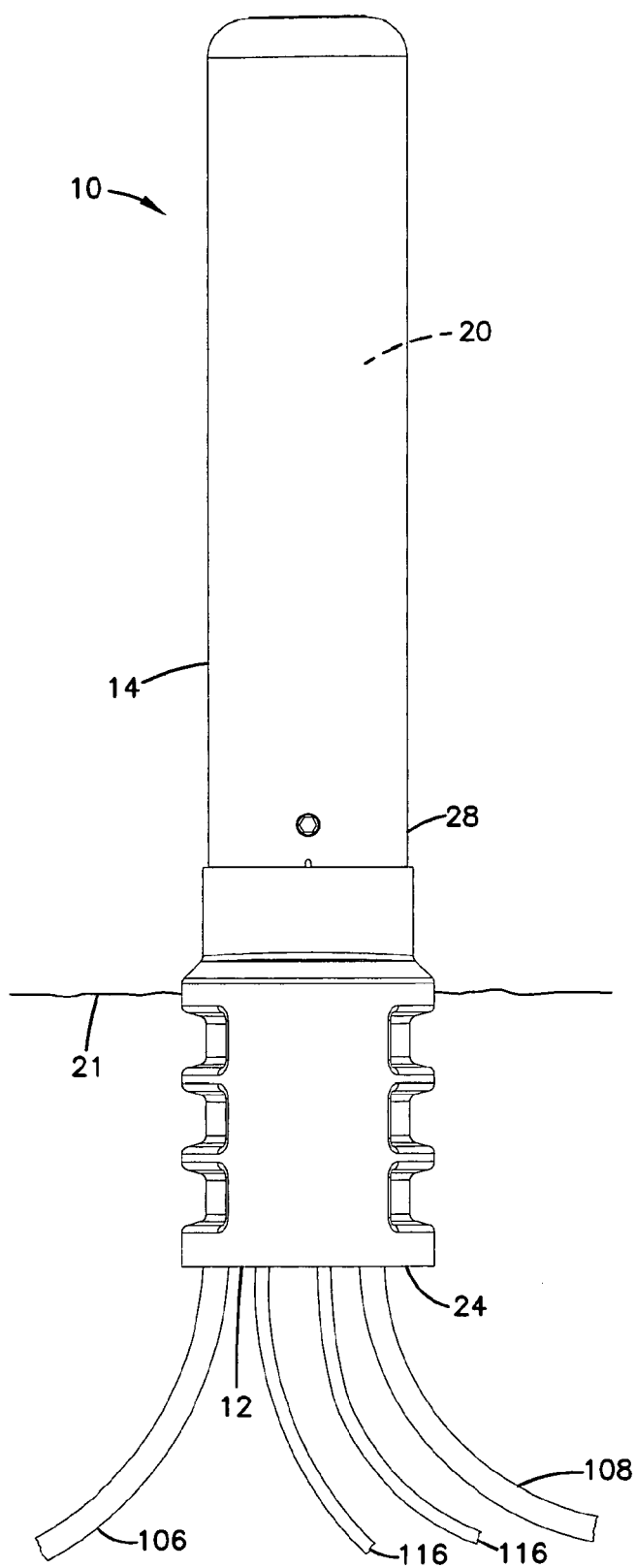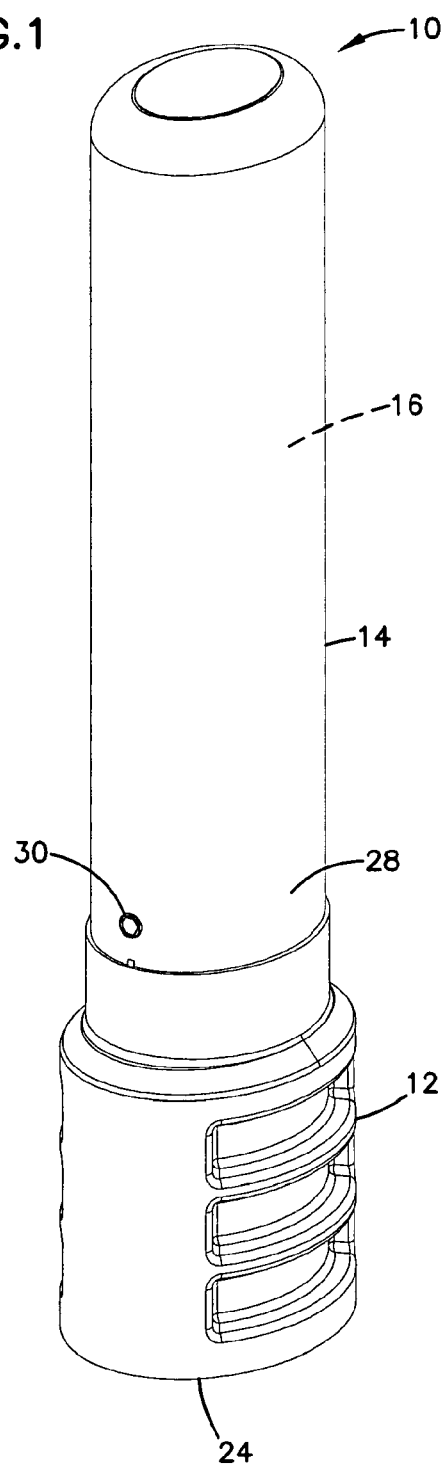

FIG.2
FIG.6
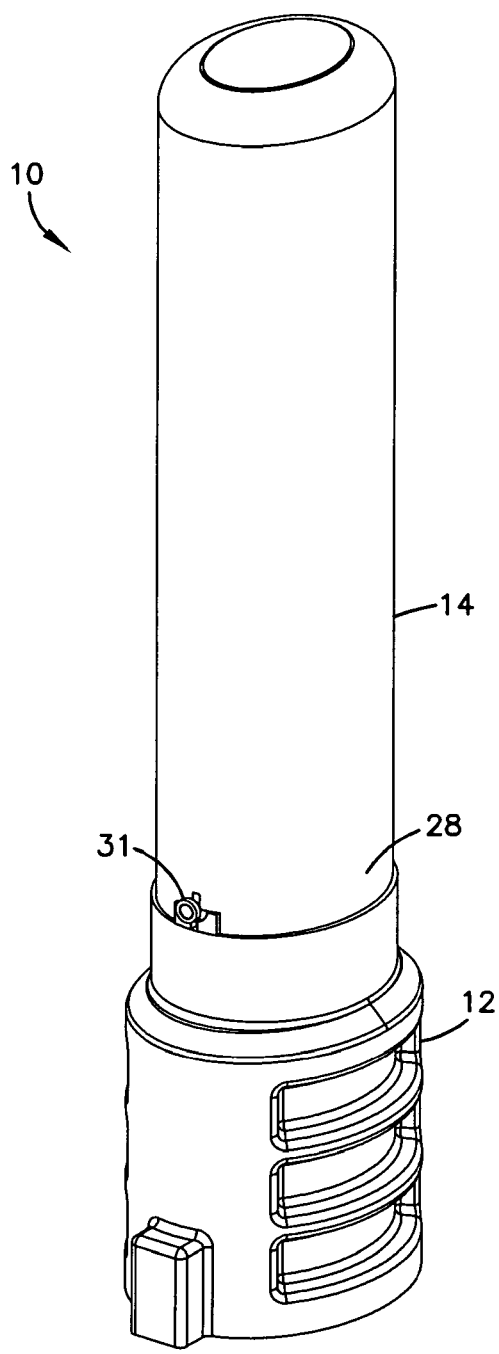
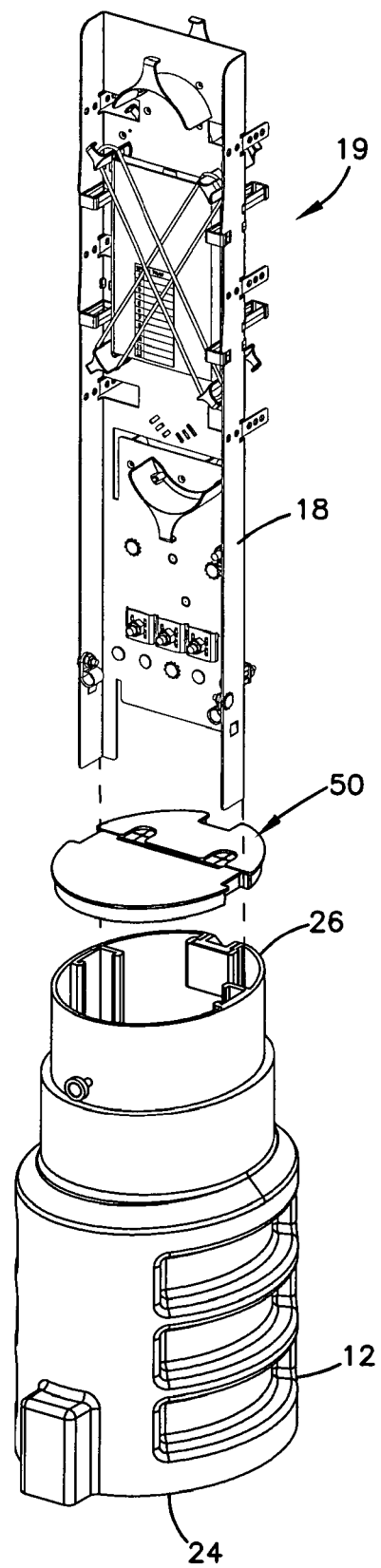

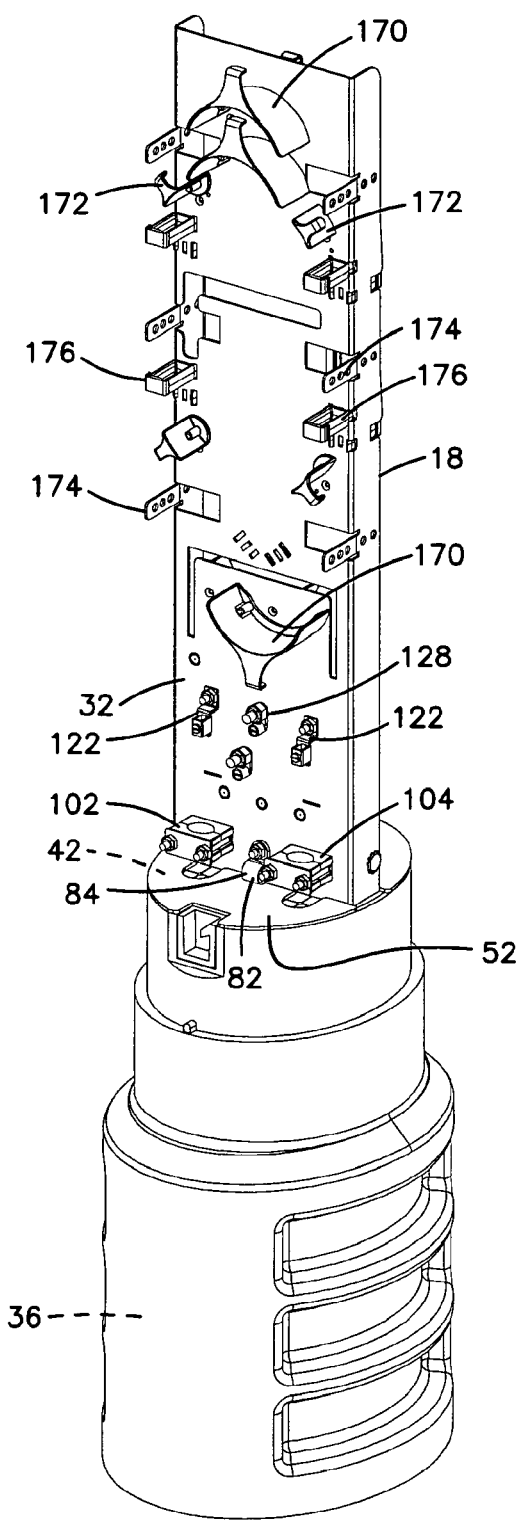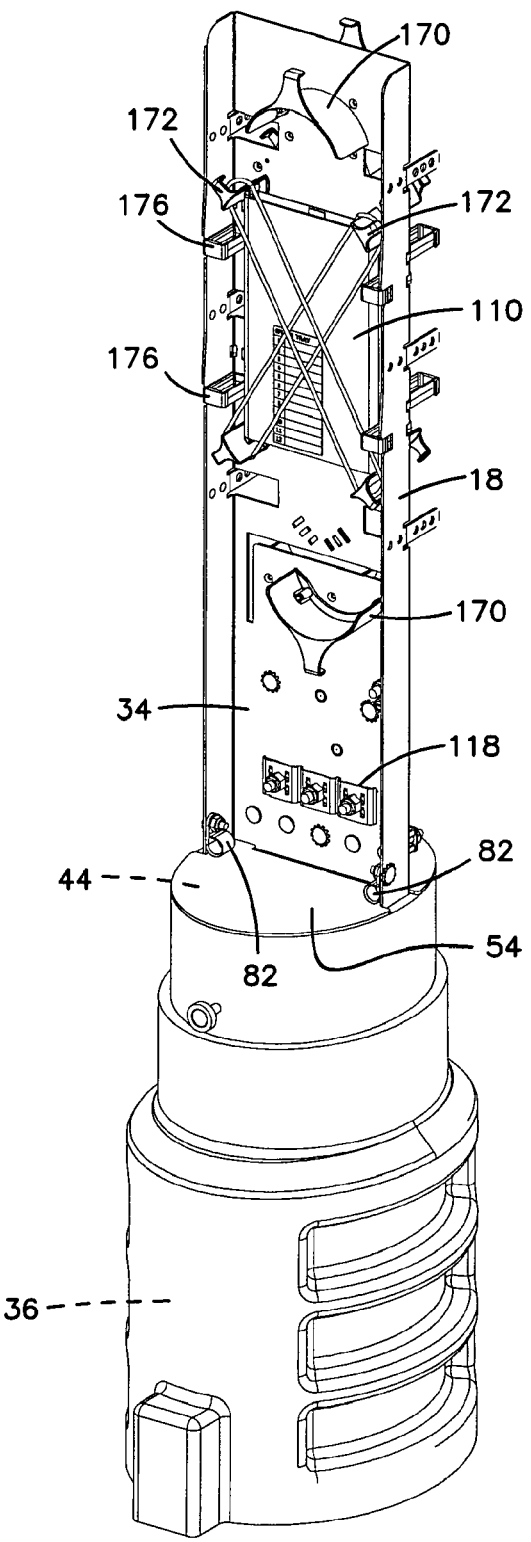

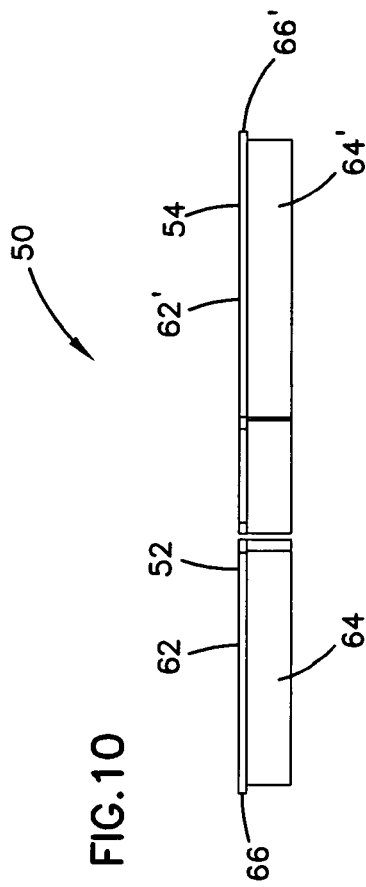
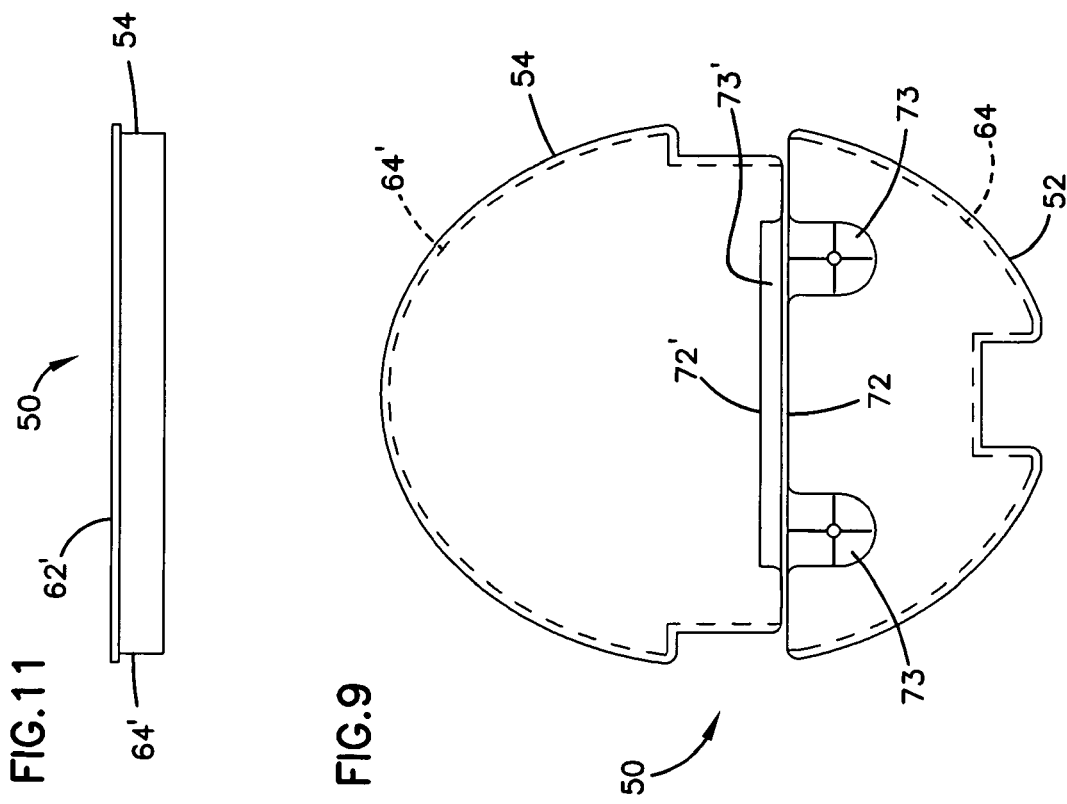

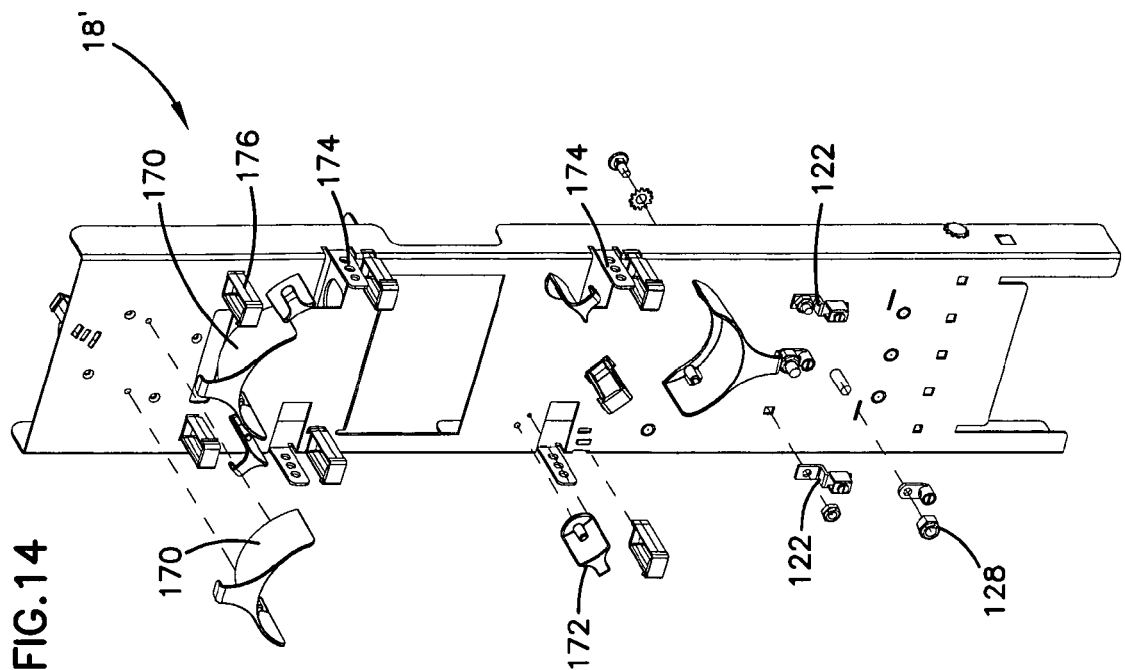
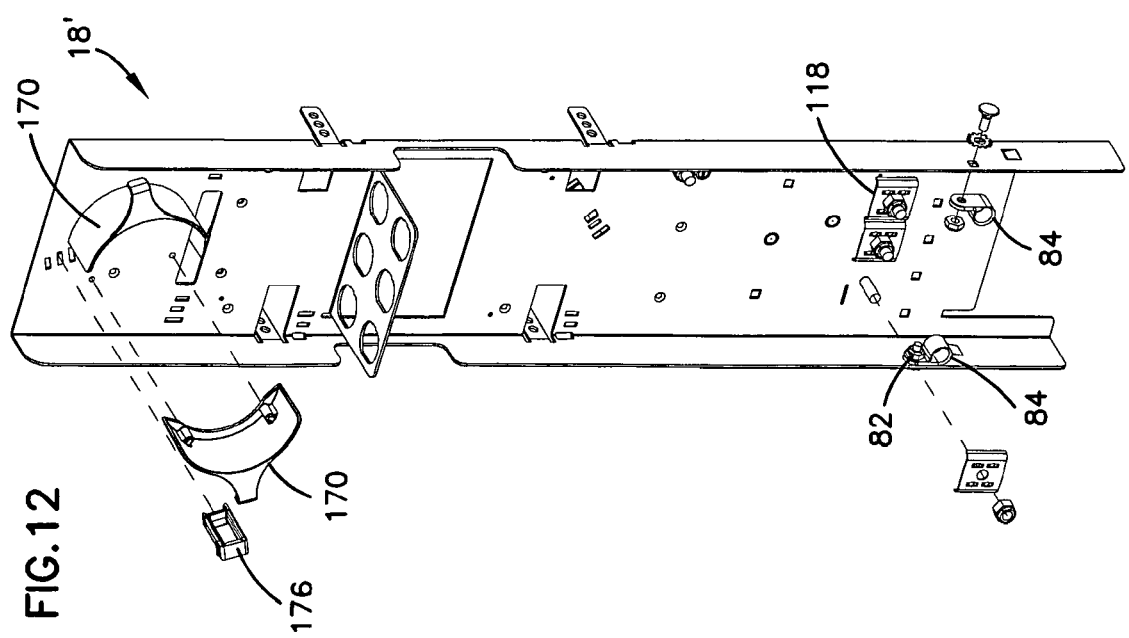

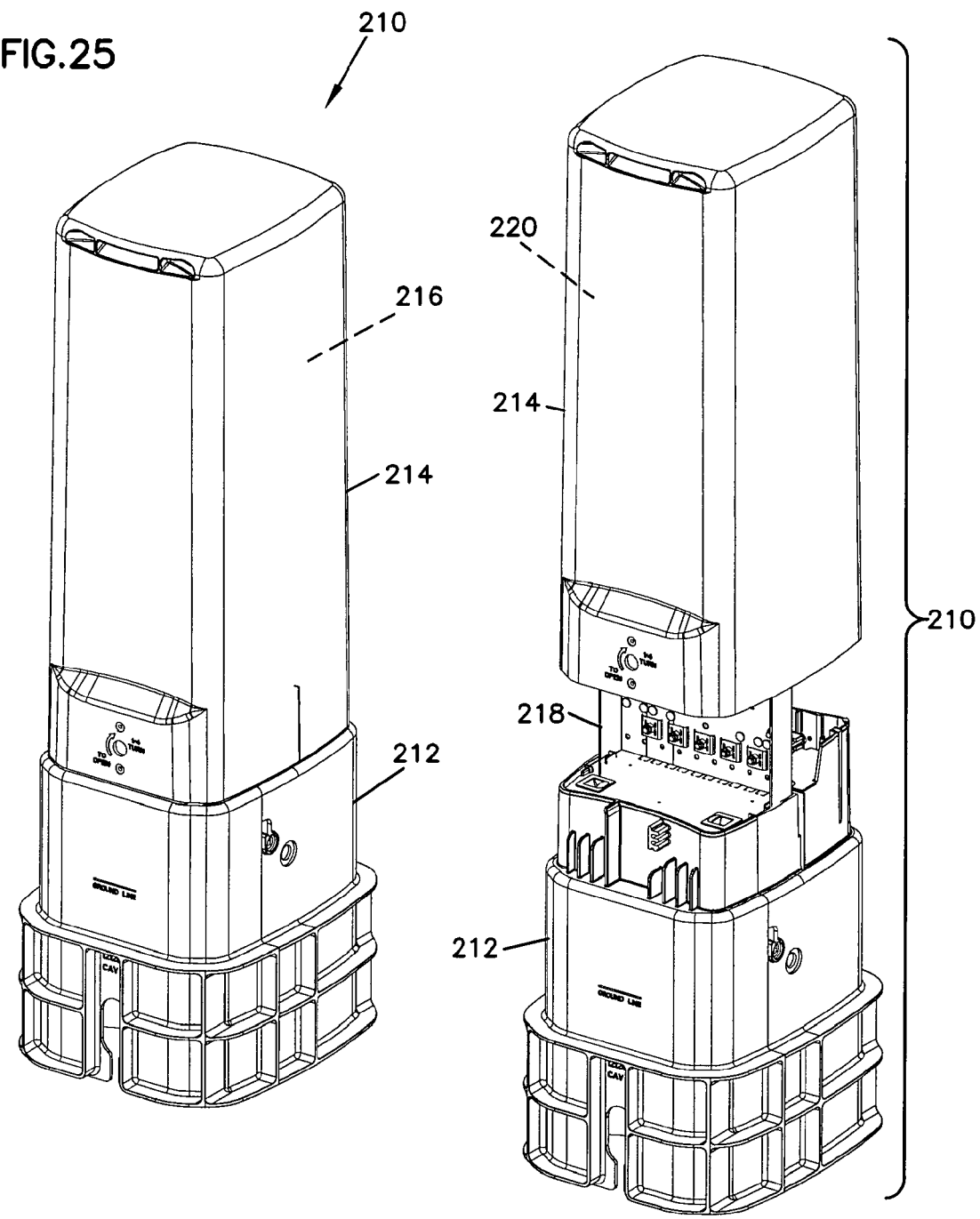

FIG.27
FIG.28
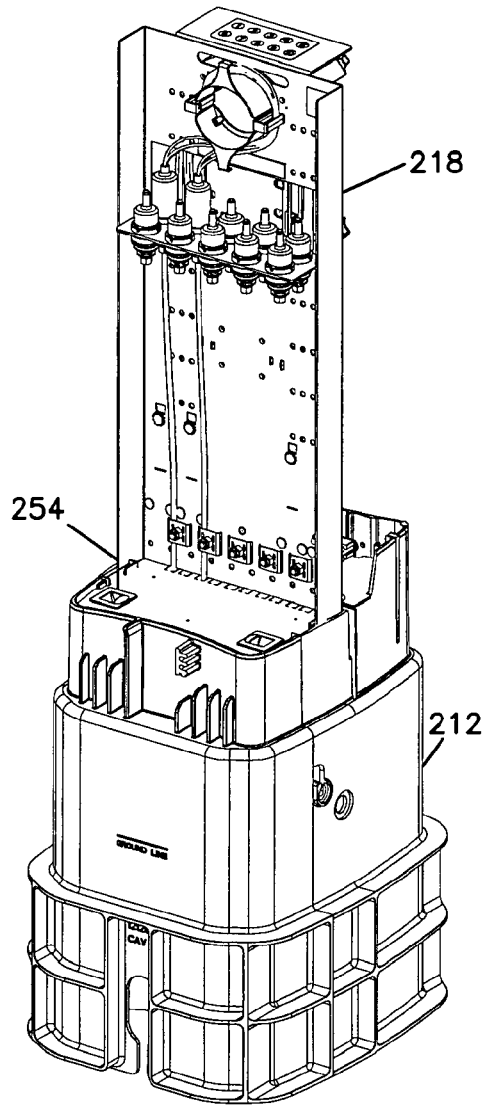
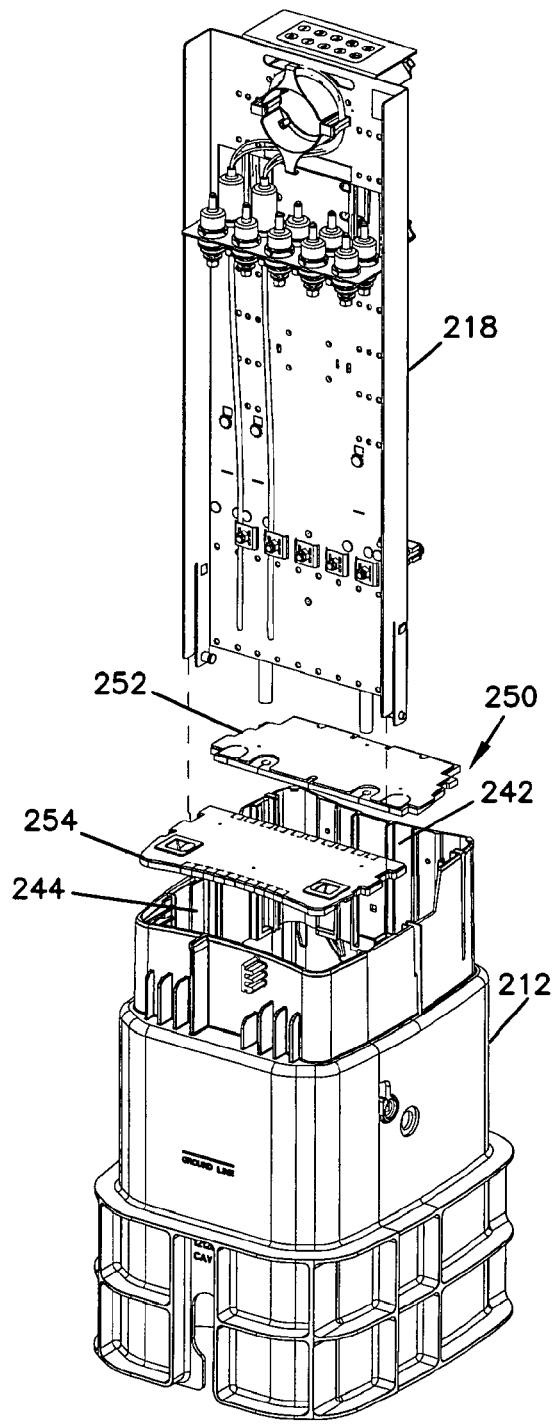

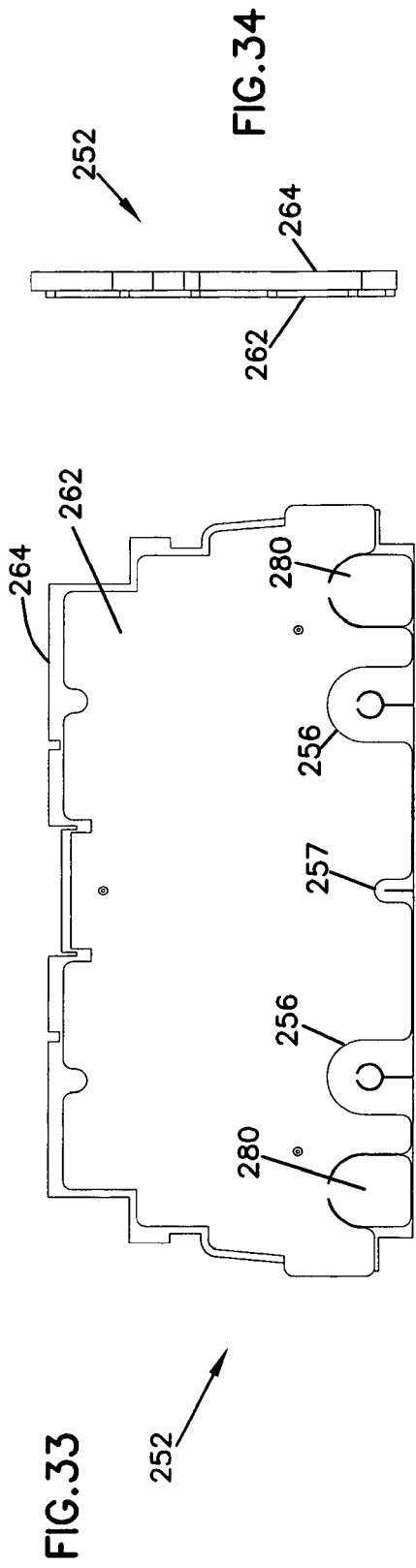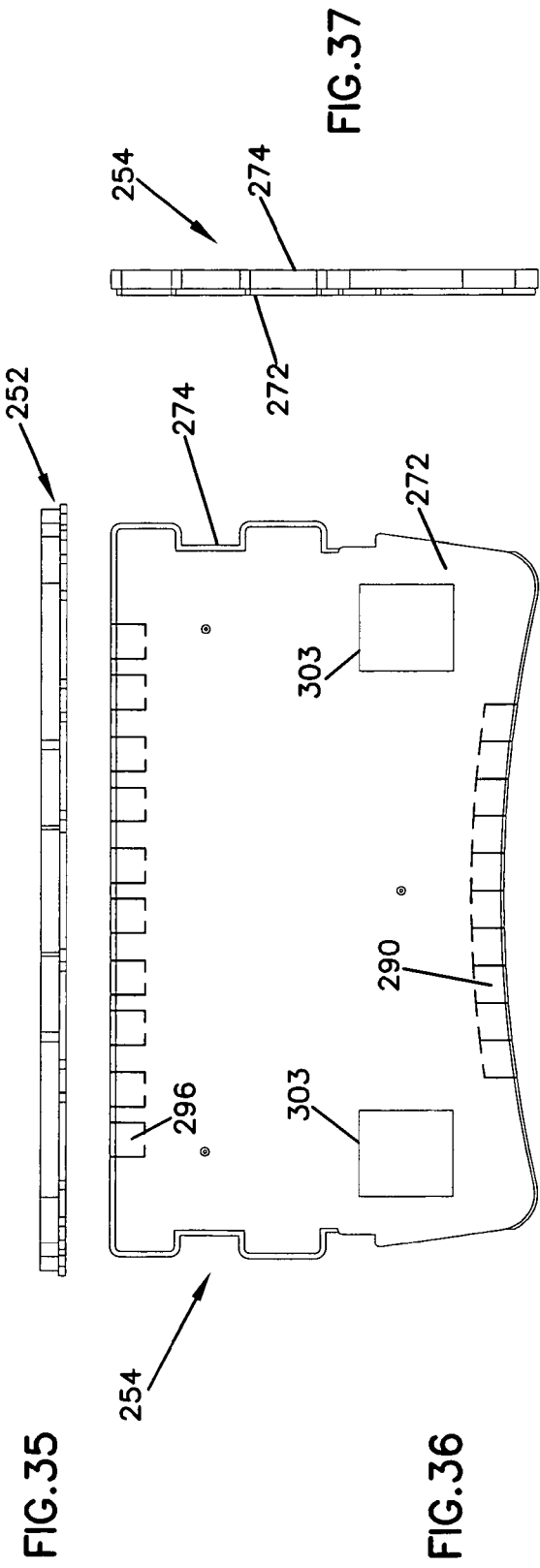

FIBER ACCESS TERMINAL INCLUDING MOISTURE BARRIER PLATE WITH PUNCH OUT

RELATED APPLICATION

This application is a continuation of U.S. patent application Ser. No. 12/029,245, entitled FIBER ACCESS TERMINAL INCLUDING MOISTURE BARRIER PLATE WITH PUNCH OUT and filed on Feb. 11, 2008, which is a continuation of U.S. patent application Ser. No. 11/585,327 (now U.S. Pat. No. 7,330,628), entitled FIBER ACCESS TERMINAL INCLUDING MOISTURE BARRIER PLATE WITH PUNCH OUT and filed Oct. 23, 2006, which is related to application Ser. No. 11/335,193 (now U.S. Pat. No. 7,308,183), entitled FIBER ACCESS TERMINAL INCLUDING MOISTURE BARRIER PLATE, filed Jan. 19, 2006, the disclosures of which are incorporated by reference in their entirety.

TECHNICAL FIELD

The present invention relates generally to provision of optical fiber telecommunications service. More specifically, the present invention relates to a fiber access terminal and a method of using a fiber access terminal.

BACKGROUND

As demand for telecommunications increases, optical fiber services are being extended in more and more areas. To more efficiently extend the fiber optic service into areas where current and future customers are located, often distribution cables with more then one optical fiber are utilized. To provide service to a particular premises in the area, the distribution cables may be received within a fiber access terminal. Such terminals provide a location in the field where one or more optical fibers of the distribution cable may be split out from the distribution cable. The remainder of the fibers within the distribution cable may then be expressed through the fiber access terminal to extend to another location where service is desired.

Within the fiber access terminal, a variety of fiber terminations and equipment is located. Typically, a base of the fiber access terminal is buried in the ground, and an upper portion of the fiber access terminal is positioned above the ground. There is a need to protect the fiber terminations and equipment within the fiber access terminal from contaminants, such as weather, water, debris, and animals.

SUMMARY

The present invention relates to a fiber access terminal including a base defining an interior and mountable to the ground. A dome cover defines an enclosed interior and is mounted to the base. A frame holds telecommunications equipment and is mounted to the base and extends into the interior defined by the dome cover. The frame and the base cooperate to define one or more passageways between an interior defined by the base and the interior defined by the dome cover. A removable cover is provided to close the one or more passageways. In such a manner, contamination of the interior of the dome cover and the telecommunications equipment contained within is lessened. The cover can be customized with the use of break out areas for receipt of the cables.

BRIEF DESCRIPTION OF THE DRAWINGS

The accompanying drawings, which are incorporated in and constitute a part of the specification, illustrate several aspects of the present invention and together with the description, serve to explain the principles of the invention. A brief descriptions of the drawings is as follows:

FIG. 1 is a first perspective view of a fiber access terminal according to the present invention.

FIG. 2 is a further perspective view of the fiber access terminal of FIG. 1.

FIG. 3 is a side view of the fiber access terminal of FIG. 1, showing the base mounted in the ground and cable leading to and exiting from the base.

FIG. 4 is a perspective view like FIG. 1, without the dome cover.

FIG. 5 is a perspective view like FIG. 2, without the dome cover.

FIG. 6 is an exploded perspective view of FIG. 5.

FIG. 9 is a top view of the removable covers.

FIG. 10 is first side view of the removable covers.

FIG. 11 is a second side view of the removable covers.

FIG. 12 is a first perspective view of an alternative embodiment for the frame.

FIG. 14 is a second perspective view of the alternative frame of FIG. 12.

FIG. 25 is a perspective view of an alternative fiber access terminal.

FIG. 26 is a perspective view of the fiber access terminal of FIG. 25, showing the dome cover partially removed.

FIG. 27 is a perspective view of the fiber access terminal of FIG. 25, with the dome cover completely removed.

FIG. 28 is an exploded perspective view of the frame, base, and removable covers of the fiber access terminal of FIG. 27.

FIG. 31 is a perspective view of the other removable cover of the fiber access terminal of FIGS. 27 and 28, shown without the slide latches.

FIG. 33 is a top view of the removable cover of FIG. 29.

FIG. 34 is a side view of the removable cover of FIG. 33.

FIG. 35 is a further side view of the cover of FIG. 33.

FIG. 36 is a top view of the other removable cover of FIG. 31.

FIG. 37 is a side view of the removable cover of FIG. 36.

DETAILED DESCRIPTION

Figure 7:
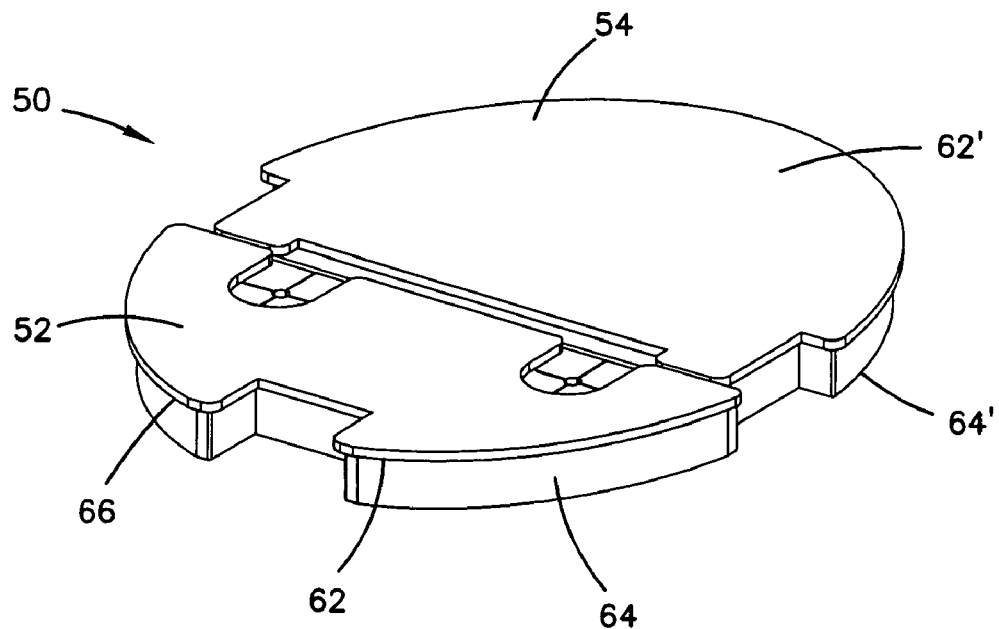
FIG. 7 is a first perspective view of the removable covers.
Figure 8:
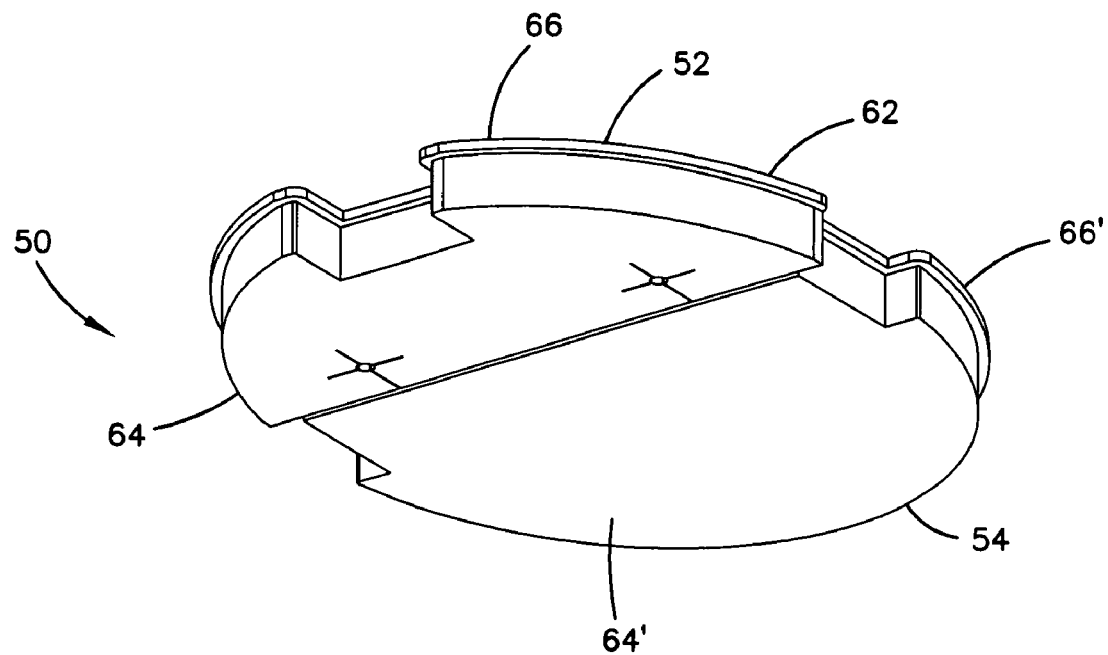
FIG. 8 is a second perspective view of the removable covers.

Reference will now be made in detail to the exemplary aspects of the present invention that are illustrated in the accompanying drawings. Whatever possible, the same reference numbers will be used through out the drawings to refer to the same or like parts. Referring now to FIGS. 1-11, a fiber access terminal 10 is shown including a base 12, and a dome cover 14 which define a protected interior 16. A frame 18 is mounted to base 12 and holds telecommunication equipment 19, such as terminations, splices, and breakouts. The frame 18 is mounted to the base and extends into an interior 20 of dome cover 14. A first end 24 of base 12 is mounted below ground level 21. A second end 26 of base 12 projects above ground level and mounts to a bottom end 28 of dome cover 14. Latches 30, 31 mount dome cover 14 to base 12.

Frame 18 includes a first side 32 and an opposite second side 34. One or both of sides 32, 34 can hold the telecommunications equipment. First and second sides 32, 34 of frame 18 cooperate with second end 26 of base 12 to define first and second passageways 42, 44 extending between an interior 36 of base 12 and interior 20 of dome cover 14 from base 12. First and second passageways 42, 44 can allow for undesirable elements to enter interior 20 of dome cover 14, such as moisture and animals. Moisture in the air can pass from the ground into dome cover 14 and condense on dome cover 14 or on frame 18 and the telecommunications equipment. Animals, such as mice, can enter interior 20 of dome cover 14 from base 12 and disrupt the cable connections. Hand access to the passageways 42, 44 is needed during system set up to allow the cables passing through the ground to pass through into dome cover interior 20.

Terminal 10 includes a cover system 50 for selectively covering the first and second passageways 42, 44. In the preferred embodiment, cover system 50 includes a first removable cover 52 for closing first passageway 42, and a separate, second removable cover 54 for closing second passageway 44.

First removable cover 52 includes a top member 62 and a compressible base member 64 mounted to the top member 62. The compressible base member preferably engages the frame 18 and the base 12 to close the first passageway 42. The compressible base member 64 is preferably made from a material such as foam. Foam base member 64 and the other polymeric materials preferably meet the anti-fungus growth tests as specified in the GR-13-Core requirements for Telcordia Requirements for Outside Plant Enclosures, specifically the ASTM G-21 test. One example foam that is usable is SCE-41 neoprene, closed cell foam.

Preferably top member 62 of first removable cover 56 is planar in shape and is made from plastic, such as ABS. Foam base member 64 can be joined to planar top member 62 with adhesive. Preferably, top member 62 has a first outer edge portion 66 which extends beyond the outer edge portion of foam base member 64 such that a rim is defined to engage the top edge of base 12 when first removable cover 52 is in position to close first passageway 42. In addition, an inner edge region 72 of first removable cover 52 includes the foam base member 64 extending beyond an edge of planar top member 62 in areas 73 in order to better close air passageways around cables entering interior 20 of dome cover 14.

Second removable cover 54 is constructed in a similar manner and like parts are designated with an apostrophe ('). In cover 52, areas 73 are used to seal around the distribution cables which bring service to and from terminal 10. In cover 54, area 73' is used to seal around the drop cables which lead to customers' premises. Variations are possible in the perimeter shapes of first and second removable covers 52, 54 in order to fit the first and second passageways 42, 44 of differently shaped terminals. While FIGS. 7-11 show covers 52, 54 together, covers 52, 54 are separate units. Covers 52, 54 can be operated separately to selectively close or open passageways 42,44.

A latch 82 is provided to hold first removable cover 52 in position so that first removable cover 52 does not inadvertently dislodge from its closed position. Latch 82 includes a pivoting member 84 which selectively blocks removal of first removable cover 52 from its position closing first passageway 42. Similar latches 82 are provided to hold second removable cover 54 in position. Latches 82 are movable to allow later access to passageways 42, 44.

Frame 18 includes distribution cable clamps 102, 104 on first side 32 of frame 18. Distribution cable clamps 102, 104 clamp to distribution cables extending to and from terminal 10. In use, one or more of the fiber optic cables within a distribution cable is broken out into drop cables within terminal 10. A remainder of the cables in distribution cable are expressed through terminal 10.

Figure 23:
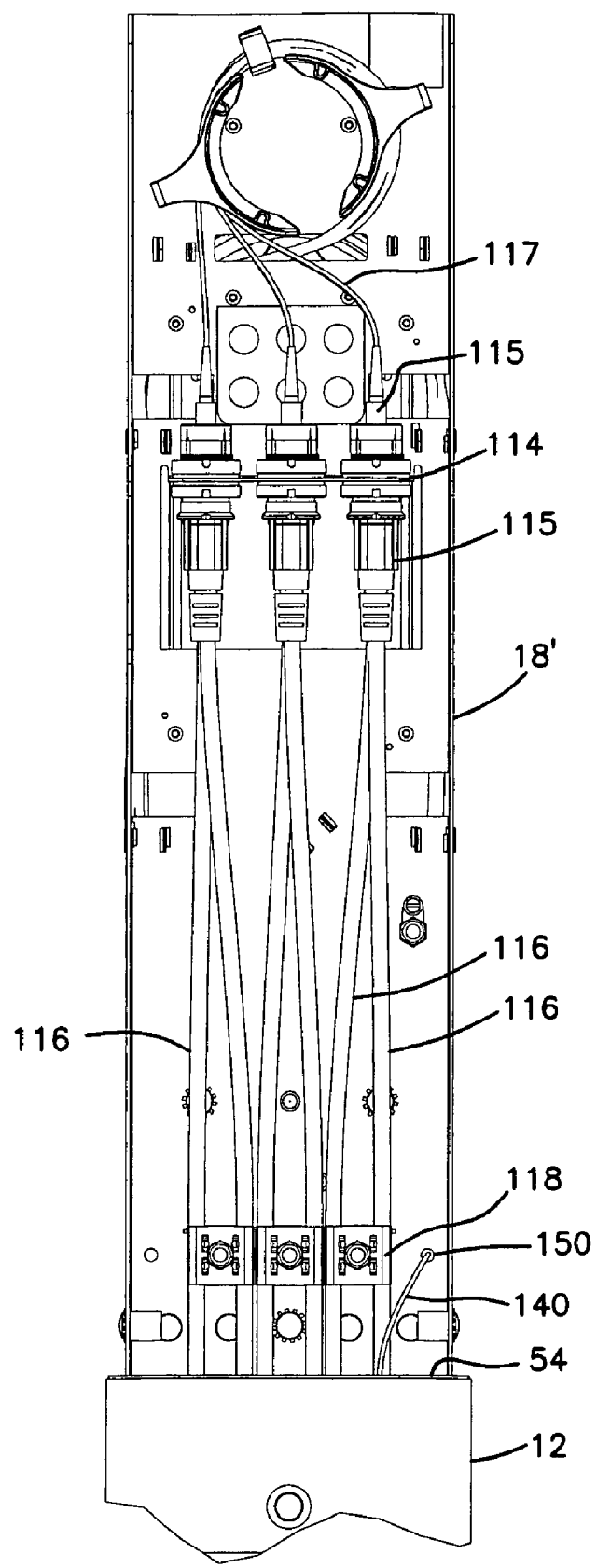
FIG. 23 is a side view of a first side of the frame of FIG. 12, showing example cabling.
Figure 24:
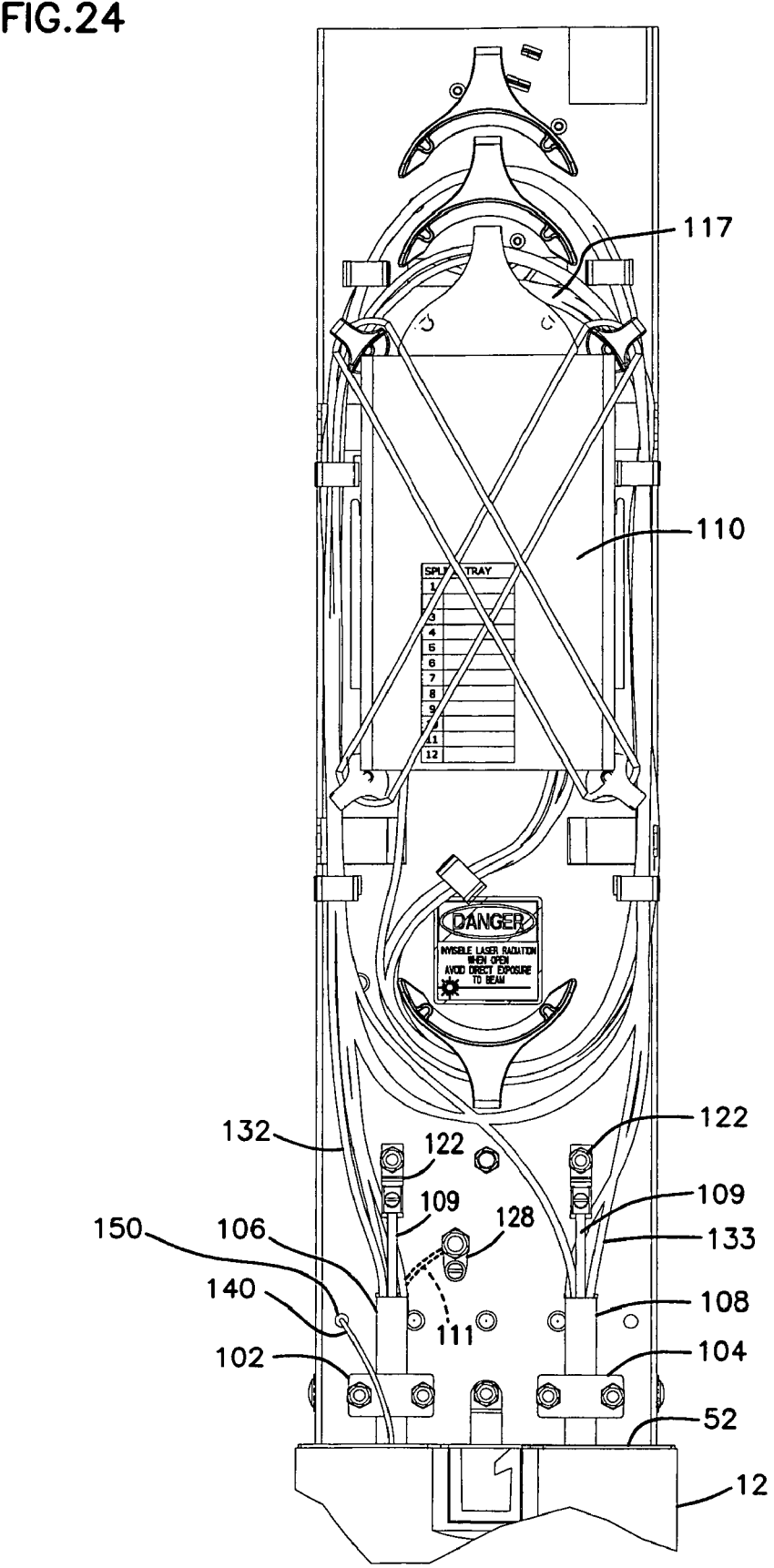
FIG. 24 is a second side view of the frame of FIG. 12, showing example cabling.

Frame 18 includes a splice holder 110. Frame 18 can also include fiber optic adapters 114 (see FIGS. 13 and 23) for holding two fiber optic connectors 115 in axial alignment. One fiber optic connector connected at one of adapters 114 is spliced to one of the broken out fibers from the distribution cable entering terminal 10. A second fiber optic connector connected to the first fiber optic connector at the selected adapter 114 is a drop cable, extending to a customer's premises. A drop cable clamp 118 on frame 18 holds the drop cable in a secure manner.

Figure 13:
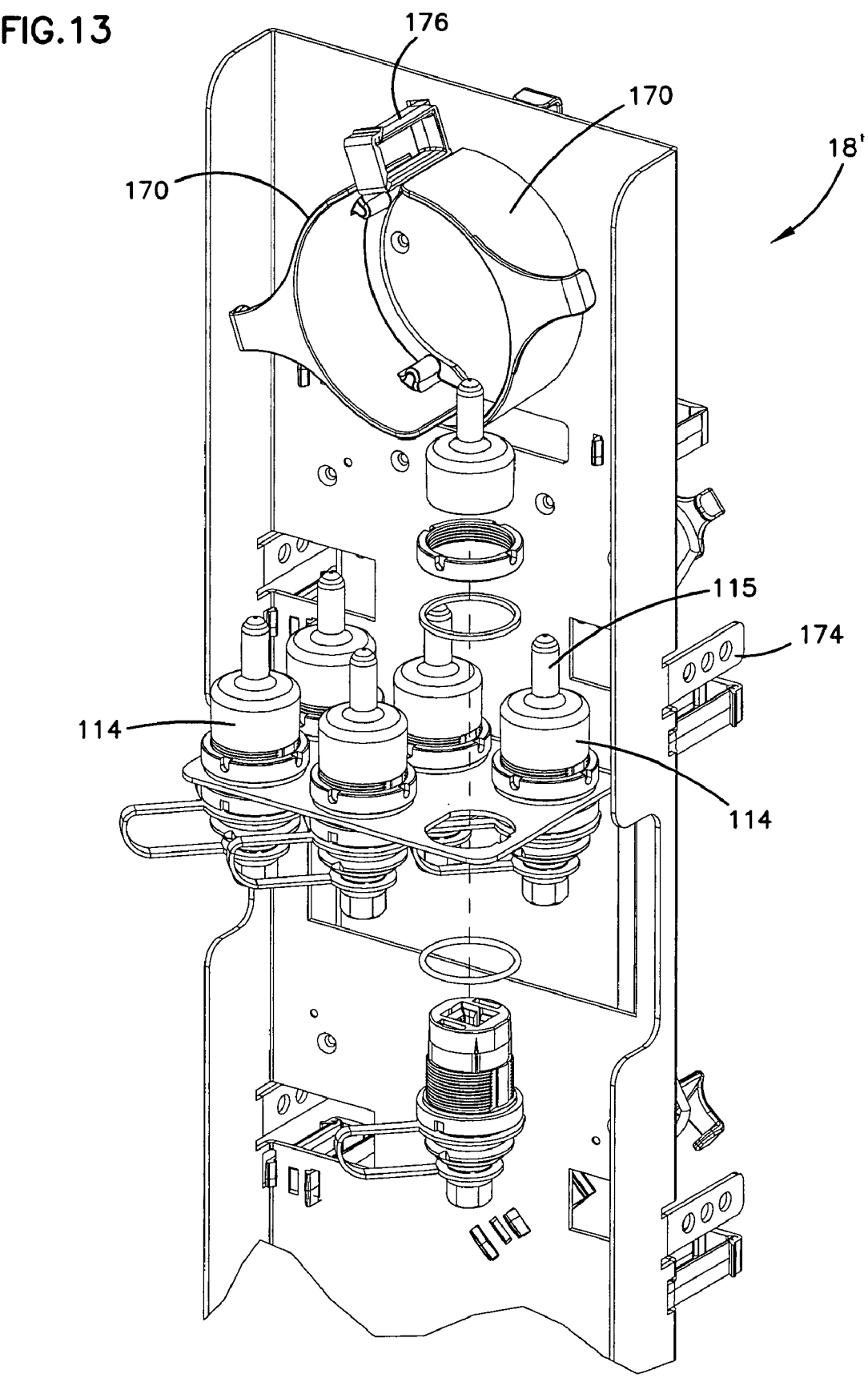
FIG. 13 is an enlarged perspective view of the alternative frame of FIG. 12 with adapters.

FIGS. 12-14 show an alternative frame 18'. Both of frames 18, 18' include various structures to manage the cables, splices and terminations in an organized manner. For example, radius limiters 170, 172, tie-offs 174, and clips 176 can be used.

Figure 15:
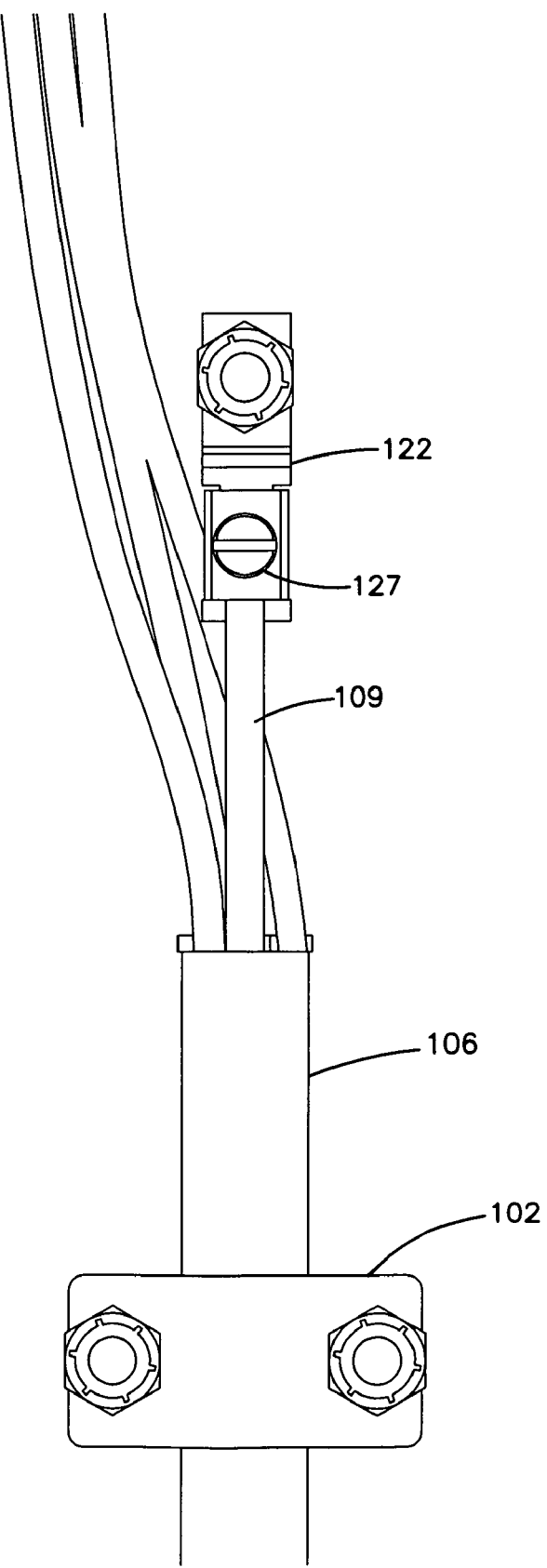
FIG. 15 shows a distribution cable and clamp, along with a strength member clamp.
Figure 16:
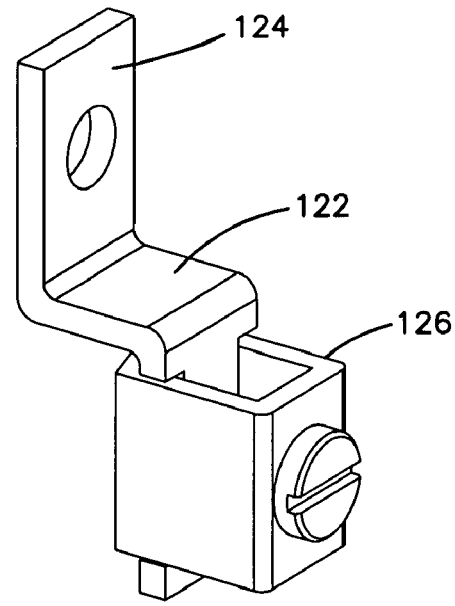
FIG. 16 shows a side view of the strength member clamp.
Figure 17:
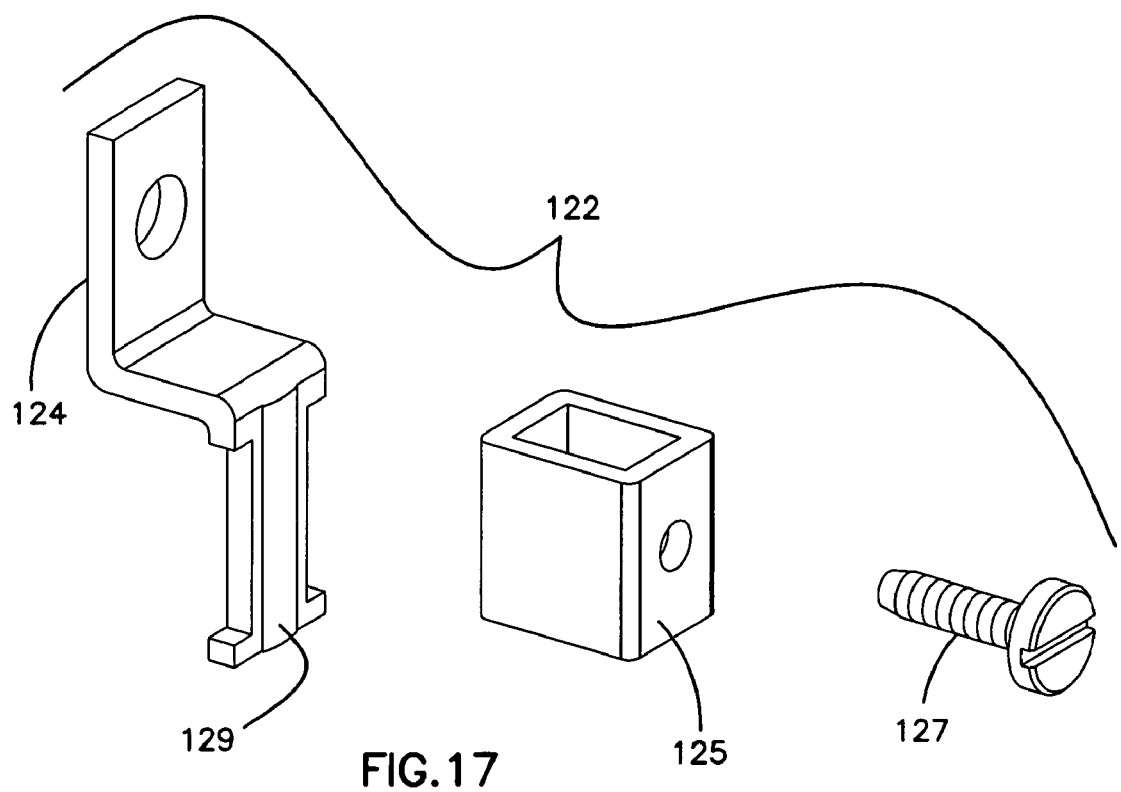
FIG. 17 shows the strength member clamp of FIG. 16 in exploded form.
Figure 18:
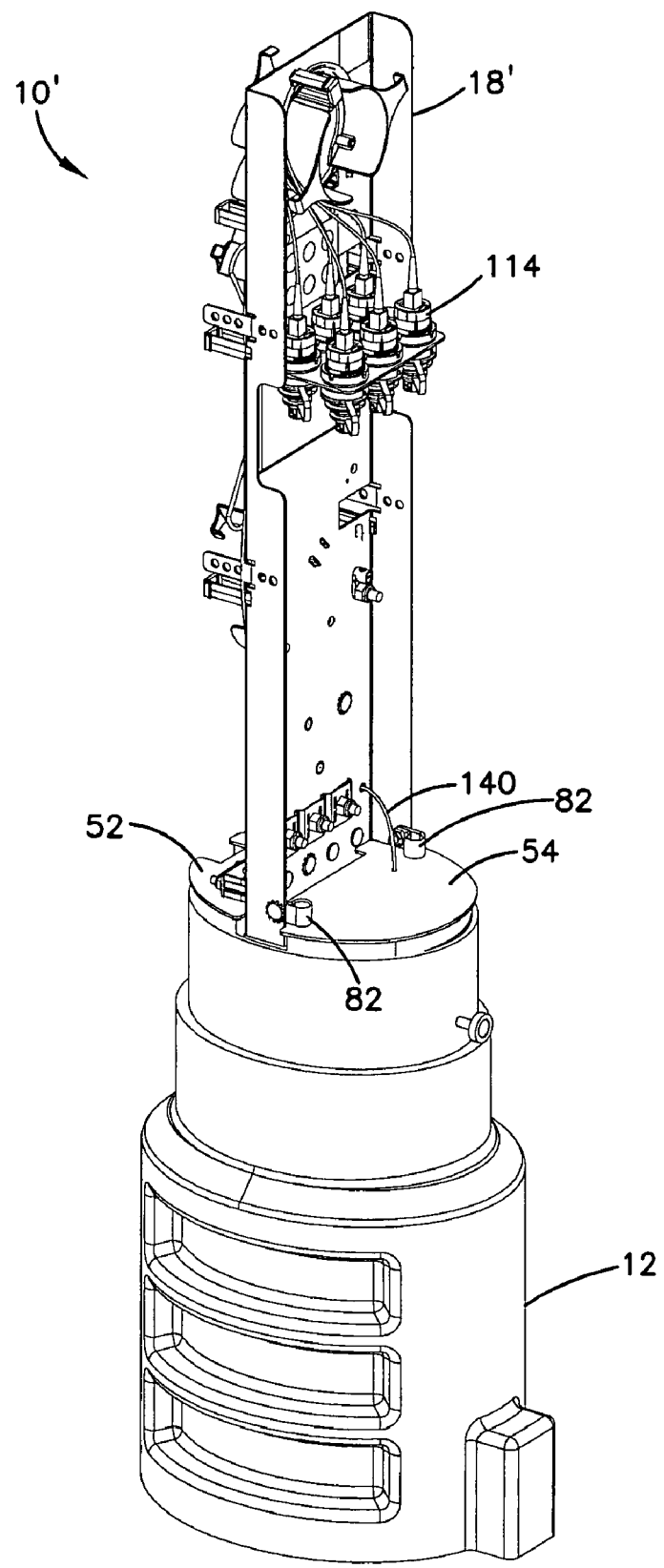
FIG. 18 shows the alternative frame of FIG. 12 mounted to the base to form a fiber access terminal, and including a tether to hold the removable covers; the removable covers shown slightly raised relative to the base.
Figure 21:
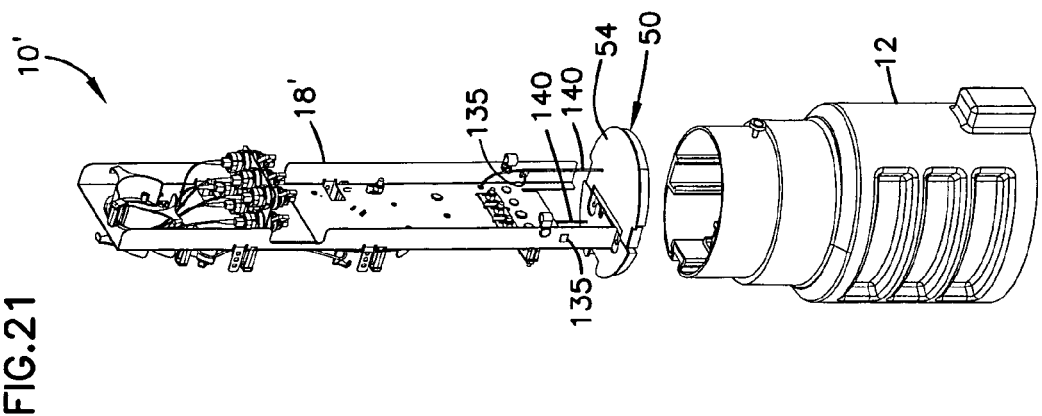
FIG. 21 is a further exploded perspective view of the fiber access terminal of FIG. 18.
Figure 20:
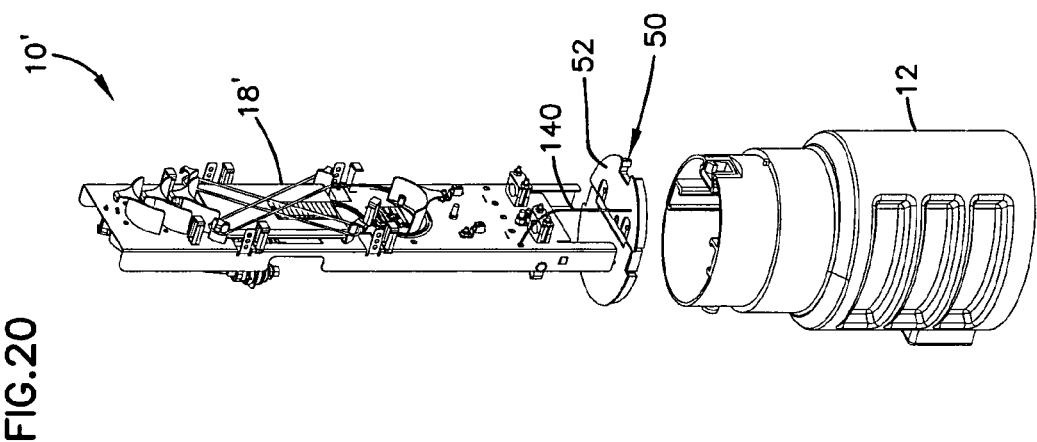
FIG. 20 is an exploded perspective view of the fiber access terminal of FIG. 18.
Figure 19:
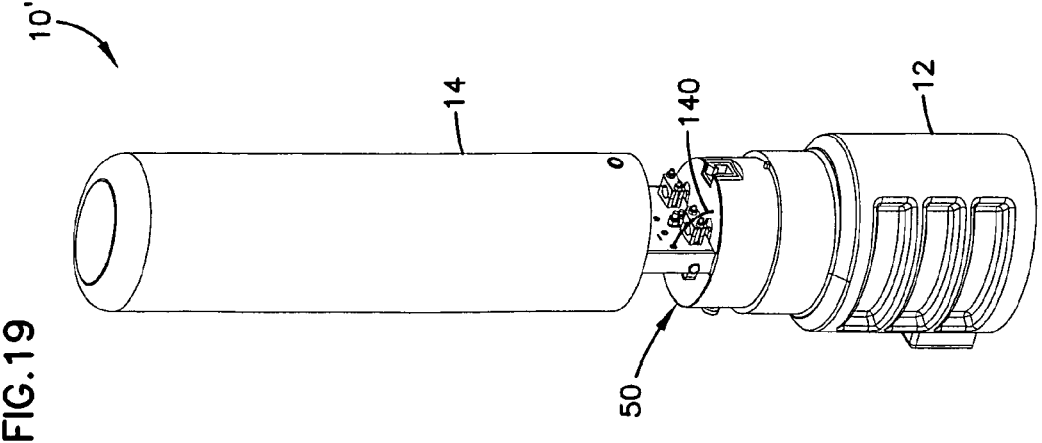
FIG. 19 is a perspective view of the fiber access terminal including the base, removable covers, and frame of FIG. 18, with the dome cover partially removed.
Figure 22:
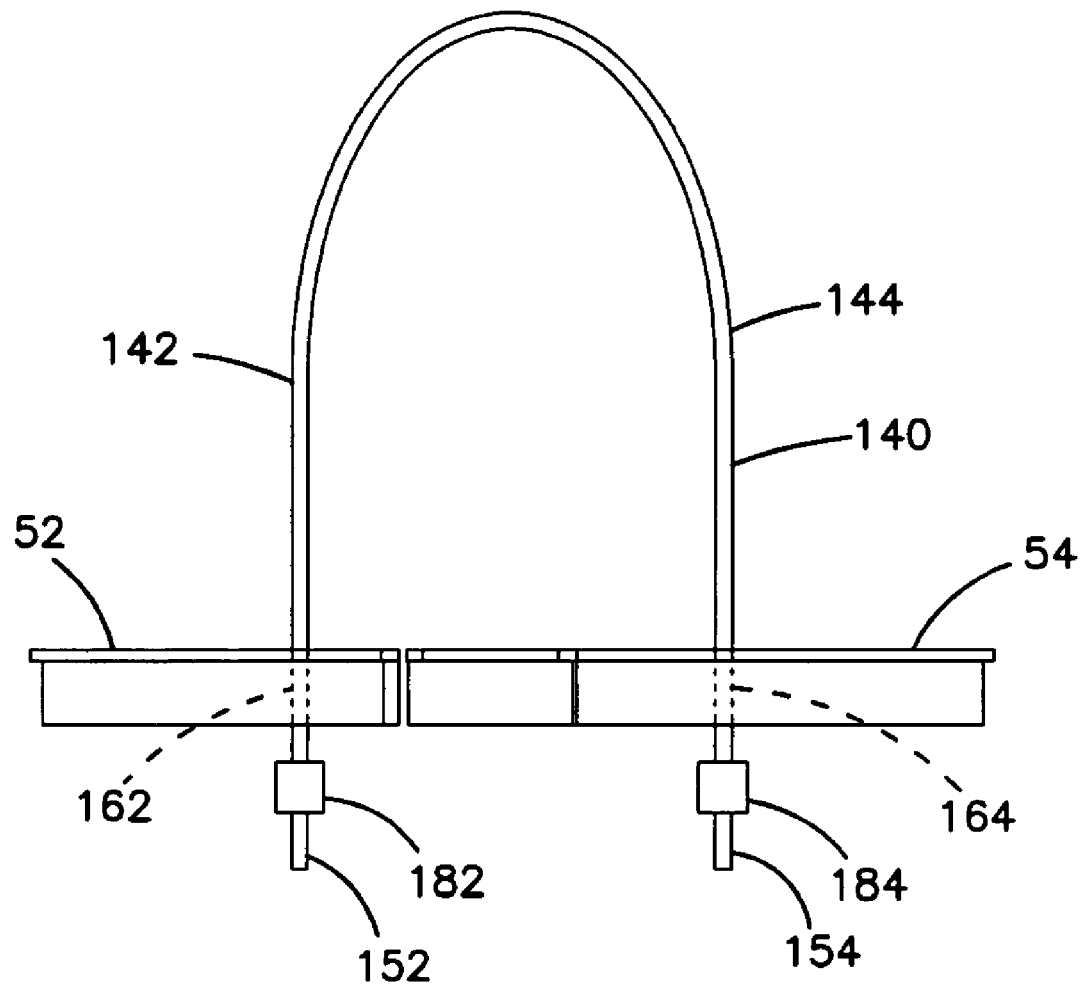
FIG. 22 is a side view of the removable covers of FIG. 18, including the tether.

To further hold the distribution cables to frame 18, a strength member clamp 122 is provided to clamp to the strength member of a distribution cable. See also FIGS. 15-17. Clamp 122 includes a fastener mount 124 for mounting to frame 18. Clamp 122 further includes a fastener clamp 126 for connecting to the strength member 109. Screw 127 cooperates with housing 125 and tab 129 to securely hold the strength member 109. Electrical grounds 128 for grounding the distribution cables can be used if desired.

Referring now to FIGS. 18-24, an alternative terminal 10' is shown with a base 12, dome cover 14, and removable covers 52, 54. To keep removable covers 52, 54 from becoming separated from terminal 10', a tether 140 is used. Tether 140 includes a first portion 142 which connects first removable cover 52 to frame 18'. A second portion 144 connects second removable cover 54 to frame 18'. In one preferred embodiment, tether 140 is a single strap or other elongated member extending through a hole 150 in frame 18' with removable covers 52, 54 connected at each end.

In one possible embodiment, tether 140 is made from an o-ring compressible material which is cut to define two ends. Each end 152, 154 is passed through a hole 162, 164 in each of removable covers 52, 54, respectively. Each end 152, 154 is crimped with crimps 182, 184 to prevent removable covers 52, 54 from separating from tether 140.

During use, tether 140 keeps removable covers 52, 54 adjacent to frame 18'. Should access to an interior of base 12 be desired, dome cover 14 is removed, exposing frame 18' and removable covers 52, 54. One or both of removable covers 52, 54 is removed from their positions closing the passageways into base 12. Tether 140 allows one or both of removable covers 52, 54 to hang along side an exterior of base 12. Tether 140 would prevent the user from reinstalling dome cover 14 onto base 12, unless the removable covers 52, 54 were back in the correct closed positions.

Frame 18' includes protrusions 135 to help prevent cover 54 from tipping, and possibly allowing access between base 12, and dome cover 14 after cover 54 is placed in the closed position. Protrusions 135 are located below cover 54 in use. Cover 52 is prevented from tipping by latch 30 positioned above cover 52 during use.

In the field, distribution cable 106 enters terminal 10, 10' from the ground (see FIG. 1). One or more of the inner cables 132 of distribution cable 106 is broken out into one or more drop cables 116 (see FIGS. 1, 23 and 24), which lead to the customers' premises. A remainder of the cables 132 are expressed through terminal 10, 10' at cables 133 and exit terminal 10, 10' at distribution cable 108 back into the ground (see FIGS. 1 and 24). Cable 108 passes to another remote terminal 10, 10', or other location where service is desired. Within terminal 10, 10', the cable or cables 132 to be broken out are connected through splices at splice holder 110, and possibly a fiber optic adapters 114 to the drop cables 116. Cables 117 link the splices at splice holder 110 to the fiber optic adapters 114 connected to the drop cables 116 (see FIGS. 23 and 24). Strength members 109 associated with distribution cables 106, 108 are clamped with strength clamping members 122 to frame 18, 18'. Ground wires 111 can be linked to frames 18, 18' with electrical grounds 128.

Referring now to FIGS. 25-40, an alternative embodiment of a fiber access terminal 210 is shown. Terminal 210 includes a differently shaped base 212, and a differently shaped dome cover 214 to define a protected interior 216, as described above for terminals 10, 10'. A frame 218 is mounted to base 212 and holds telecommunications equipment. Frame 218 is mounted to the base and extends into an interior 220 of dome cover 214. Terminal 210 includes a cover system 250 for selectively covering first and second passageways 242, 244. In the preferred embodiment, cover system 250 includes a first removable cover 252 for closing first passageway 242, and a separate, second removable cover 254 for closing second passageway 244.

Figure 30:
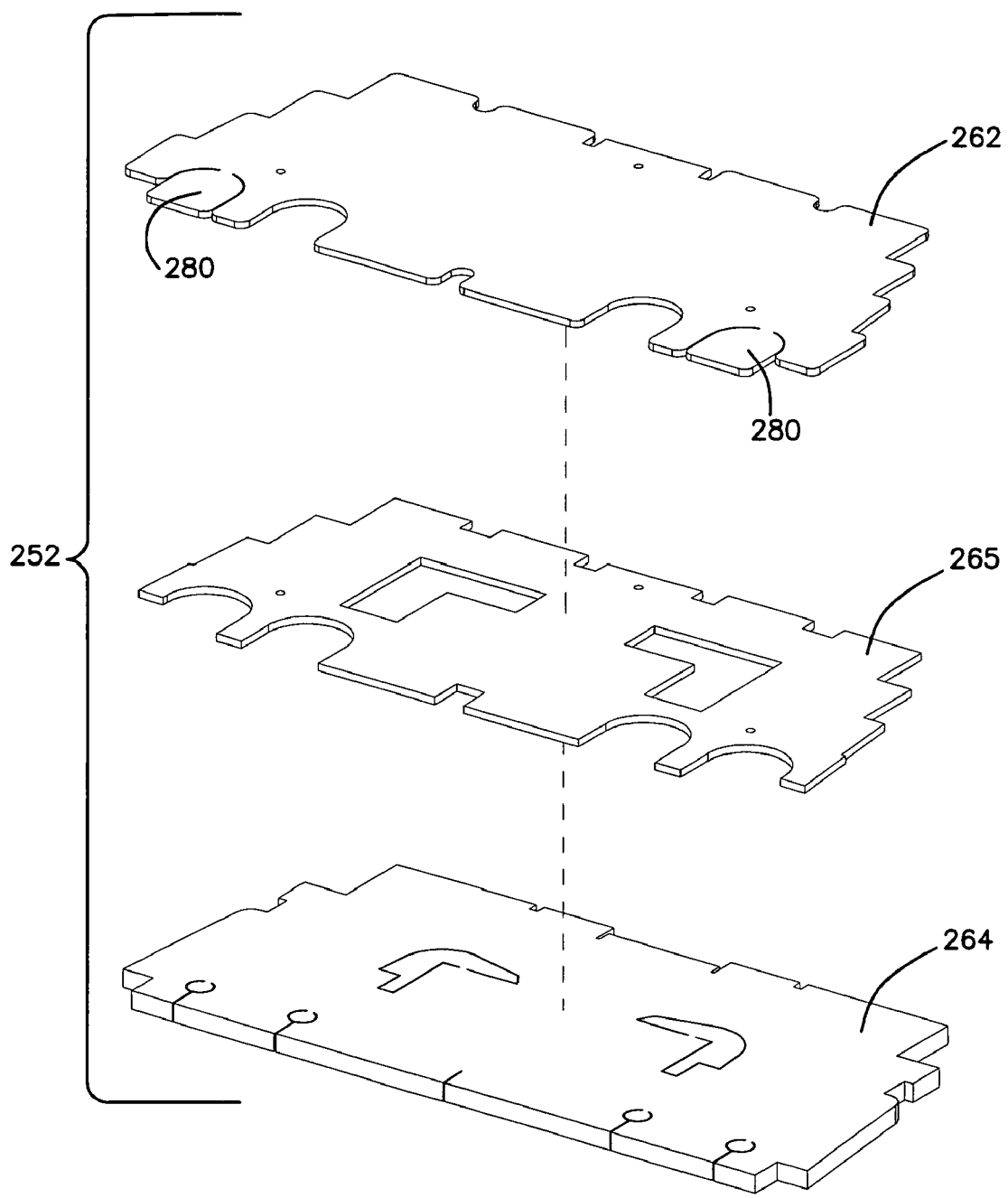
FIG. 30 is an exploded perspective view of the removable cover of FIG. 29.
Figure 32:
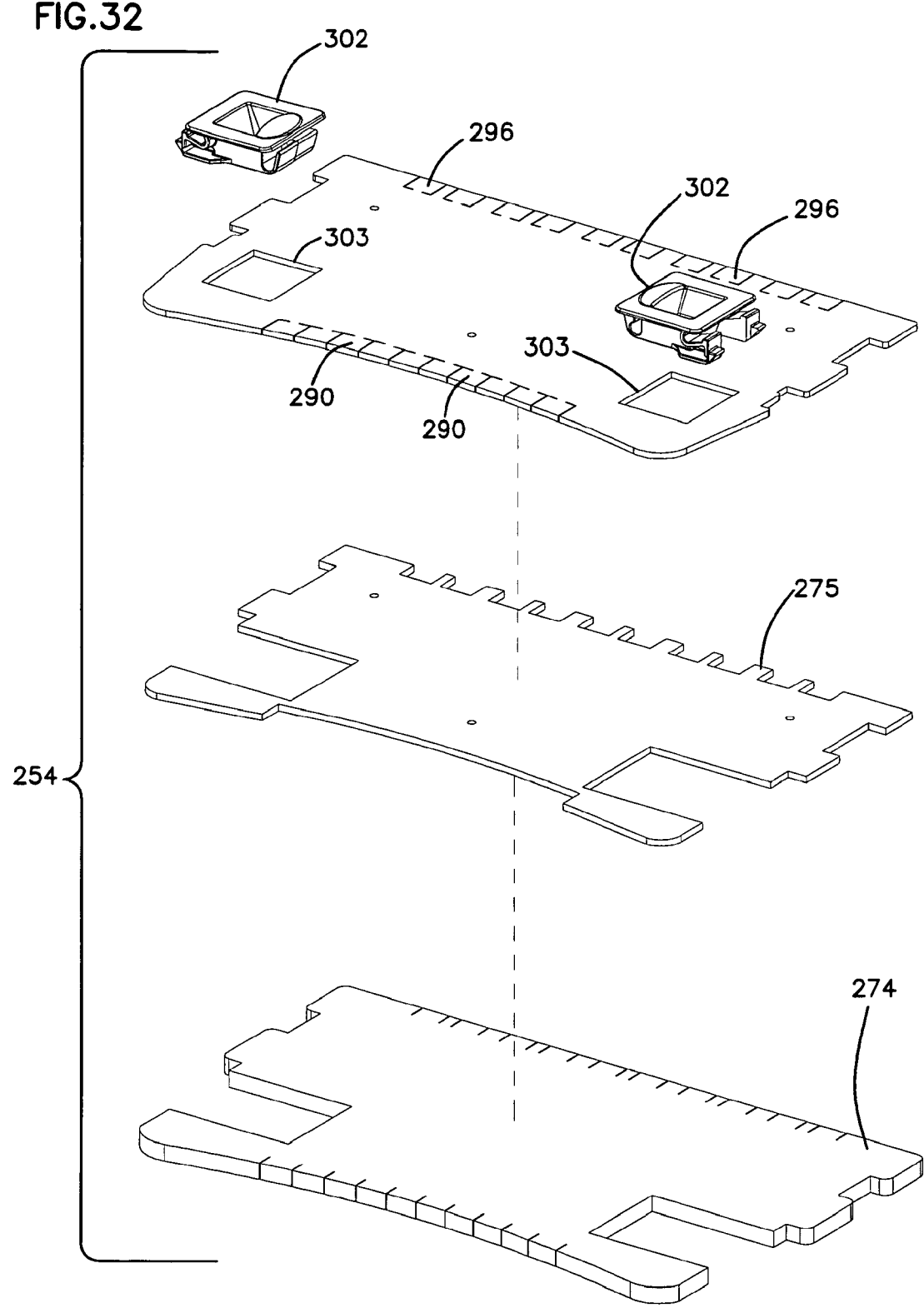
FIG. 32 is an exploded view of the removable cover of FIG. 31, shown with the slide latches.

Both first and second removable covers 252, 254 include a similar construction as covers 52, 54, noted above. As shown in FIG. 30, first cover 252 includes a planar top member 262, and a compressible base member 264, joined together by an adhesive layer 265. As shown in FIG. 32, second cover 254 includes a planar top member 272, and a compressible base member 274, joined together by an adhesive layer 275. Cover 252 includes cable areas 256, 257 where top member 262 is not present and only base member 264 is present for sealing against distribution cables. Tethers can be used as noted above to mount covers 252, 254 to frame 218 as above for terminal 10'.

Figure 29:
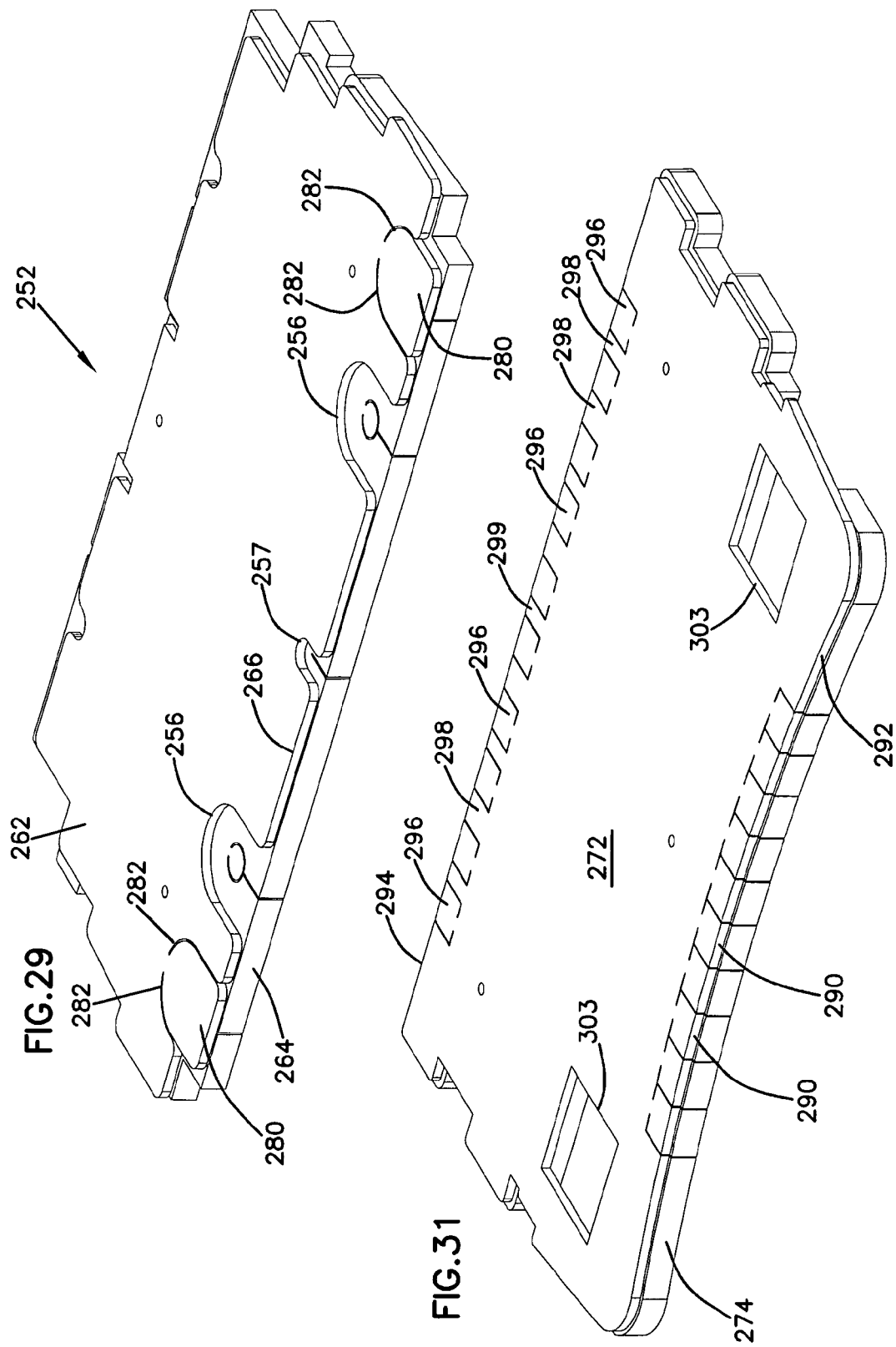
FIG. 29 is a perspective view of one of the removable covers of FIGS. 27 and 28.

Referring now to FIGS. 29, 30 and 33, first cover 252 includes plurality of break outs or punch outs 280. Punch outs 280 include cuts 282 in top member 262 along edge 266. Punch outs 280 are provided in selected locations which allow for additional cables. A technician can remove each punch out 280 by bending up or down in the desired locations, breaking the punch out 280 along cuts 282, and removing that portion of the top member 262. Such bending can occur with a tool, such as pliers. Base member 264 under the removed punch out 280 remains and seals against the cable passing through the punched out area.

Referring now to FIGS. 31, 32, and 36, second cover 254 includes plurality of break outs or punch outs 290 along edge 292. On an opposite edge 294 of cover 254, additional punch outs 296 are provided. In a similar manner, punch outs 290, 296 allow removal of top member 272 in those areas where a cable passageway is desired. The remaining areas of base member 274 under punch outs 290, 296 seals against each cable. One difference with punch outs 296 is that spacer areas 298, 299 remain in top member 272.

Figure 38:
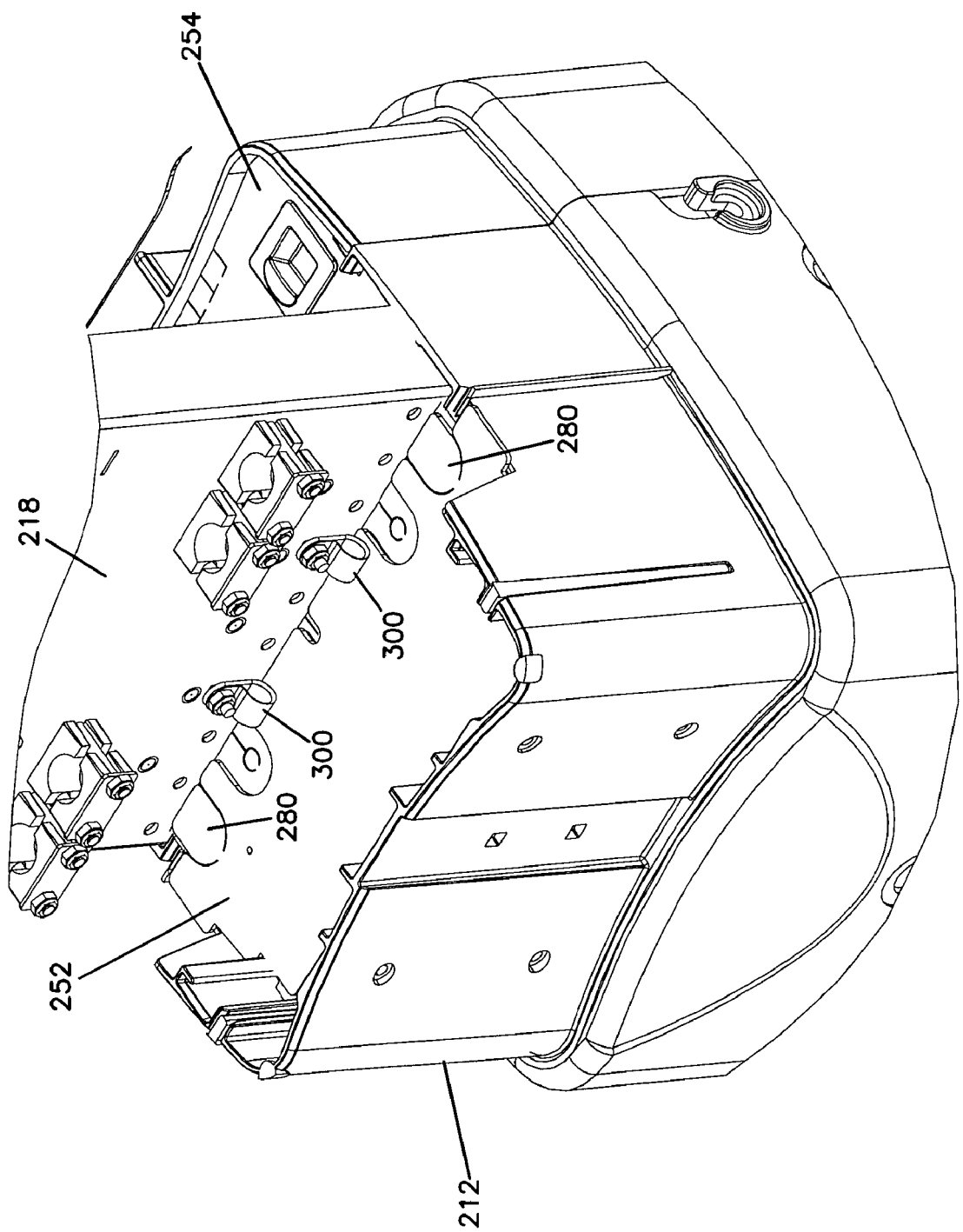
FIG. 38 is an enlarged perspective view of a portion of the fiber access terminal of FIG. 27.
Figure 39:
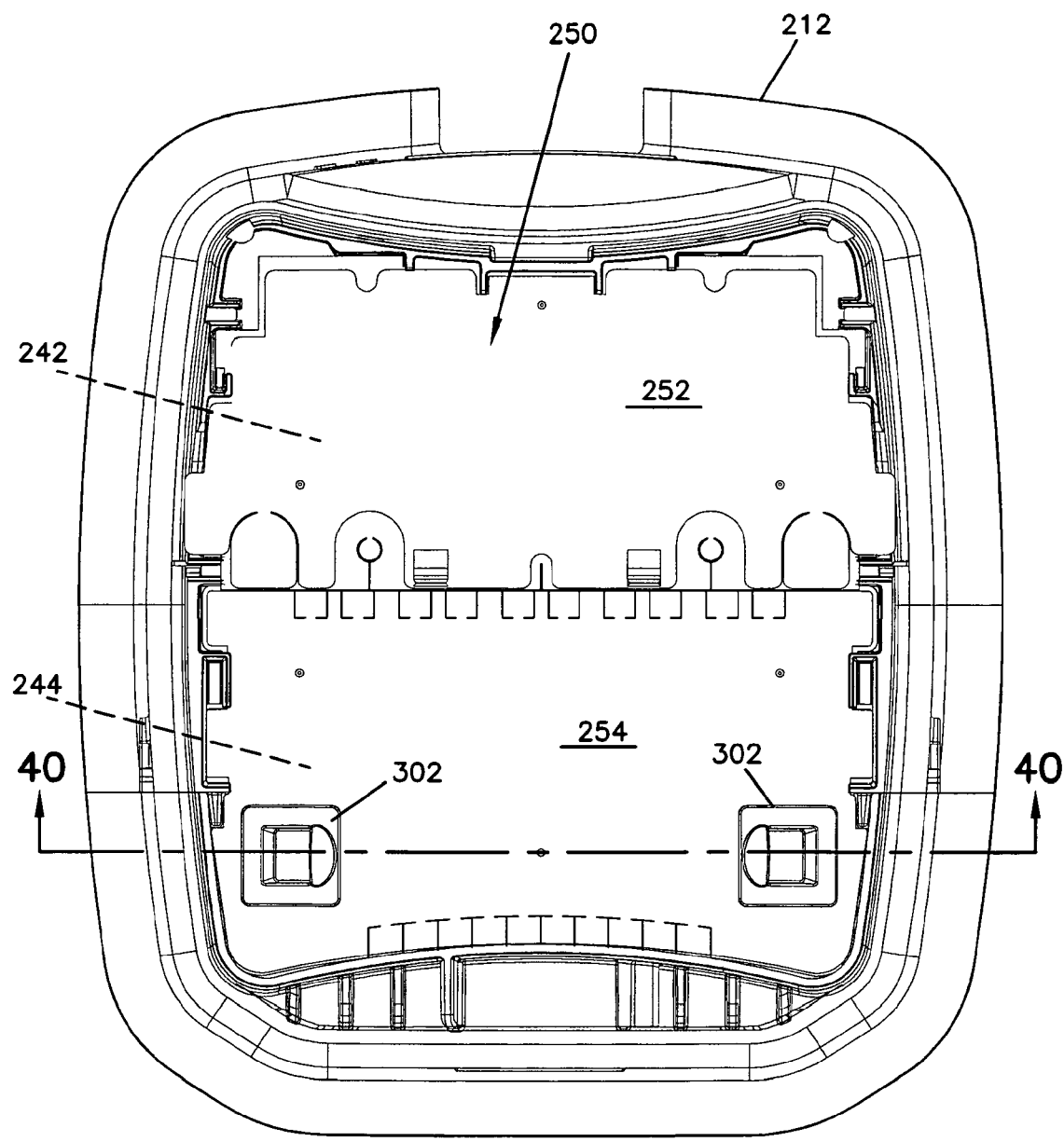
FIG. 39 is a top view of the base and removable covers of the fiber access terminal of FIGS. 27 and 28.
Figure 40:
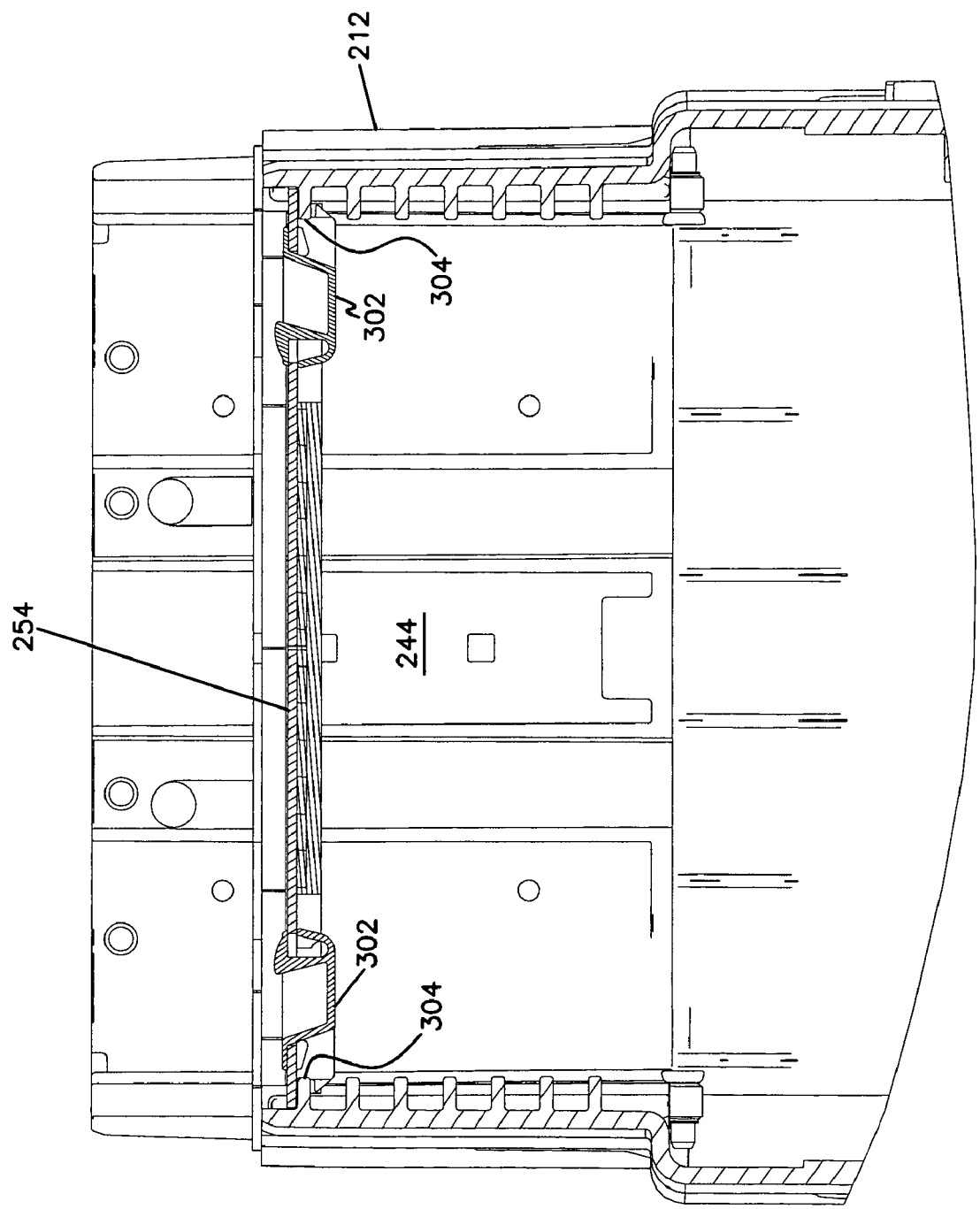
FIG. 40 is a cross-sectional side view through lines 40-40 of FIG. 39.

First cover 252 is held to base 212 with latches 300 as seen in FIG. 38, similar to latches 82 noted above. Referring again to FIGS. 26-28, 32, and 38-40 second cover 254 includes slideable latches 302. Slideable latches 302 engage shoulder structure 304 on base 212 to releaseably secure cover 254 to base 212. Slideable latches 302 are spring loaded to return to the latched positions as shown in FIG. 40. Latches 302 fit into holes 303 of cover 254.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A fiber access terminal assembly comprising:
a terminal including a base and a cover mounted to the base, the base defining a first interior, the cover defining a second interior, the terminal defining a passageway between the first interior of the base and the second interior of the cover; and
a cover system adapted to close the passageway, the cover system including a removable cover having a break out portion that is removable to receive a telecommunications cable.

2. The fiber access terminal assembly of claim 1, further comprising a frame mounted to the base and extending into the second interior of the cover.

3. The fiber access terminal assembly of claim 2, wherein the frame and the base cooperate to define the passageway.

4. The fiber access terminal assembly of claim 2, further comprising a tether connecting the removable cover to the frame.

5. The fiber access terminal assembly of claim 1, wherein the removable cover includes a top member and a base member mounted to the top member.

6. The fiber access terminal assembly of claim 5, wherein the base member is less rigid than the top member.

7. The fiber access terminal assembly of claim 5, wherein the base member is foam.

8. The fiber access terminal assembly of claim 5, wherein adhesive mounts the base member to the top member.

9. The fiber access terminal assembly of claim 5, wherein the break out portion includes cuts through the top member.

10. The fiber access terminal assembly of claim 1, wherein the break out portion is removable by punch out.

11. A fiber access terminal assembly comprising:
   a terminal including a base and a cover mounted to the base, the base defining a first interior, the cover defining a second interior, the terminal defining a passageway between the first interior of the base and the second interior of the cover; and
   a cover system including a first removable cover and a second removable cover, the first and second removable covers being adapted to close the passageway, the first and second removable covers including a break out portion that is removable to receive a telecommunications cable.

12. The fiber access terminal assembly of claim 11, further comprising a frame mounted to the base and extending into the second interior of the cover.

13. The fiber access terminal assembly of claim 12, wherein the frame and the base cooperate to define the passageway.

14. The fiber access terminal assembly of claim 12, further comprising a tether connecting the at least one of the first and second removable cover to the frame.

15. The fiber access terminal assembly of claim 11, wherein each of the first and second removable covers includes a top member and a base member mounted to the top member.

16. The fiber access terminal assembly of claim 15, wherein the base member is less rigid than the top member.

17. The fiber access terminal assembly of claim 15, wherein the base member is foam.

18. The fiber access terminal assembly of claim 15, wherein adhesive mounts the base member to the top member.

19. The fiber access terminal assembly of claim 15, wherein the break out portion of each of the first and second removable covers includes cuts through the top member.

* * * * *